US009509663B2

(12) United States Patent
Bollay et al.

(10) Patent No.: US 9,509,663 B2
(45) Date of Patent: Nov. 29, 2016

(54) SECURE DISTRIBUTION OF SESSION CREDENTIALS FROM CLIENT-SIDE TO SERVER-SIDE TRAFFIC MANAGEMENT DEVICES

(75) Inventors: Benn Sapin Bollay, Seattle, WA (US); Jeffrey Michael Warren, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 12/967,006

(22) Filed: Dec. 13, 2010

(65) Prior Publication Data

US 2011/0231653 A1 Sep. 22, 2011

Related U.S. Application Data

(60) Provisional application No. 61/315,857, filed on Mar. 19, 2010.

(51) Int. Cl.
*H04L 9/00* (2006.01)
*H04L 29/06* (2006.01)
(Continued)

(52) U.S. Cl.
CPC ......... *H04L 63/0428* (2013.01); *H04L 9/3244* (2013.01); *H04L 63/0245* (2013.01); *H04L 63/0884* (2013.01); *H04L 63/166* (2013.01);
(Continued)

(58) Field of Classification Search
CPC ..... H04L 29/08576; H04L 9/08; H04L 9/30; G11B 20/0021
USPC ......... 709/223, 227, 230, 248; 713/150–156, 713/168; 726/1–21
See application file for complete search history.

(56) References Cited

U.S. PATENT DOCUMENTS 5,267,314 A   11/1993 Stambler
5,319,638 A    6/1994 Lin
(Continued)

FOREIGN PATENT DOCUMENTS

CN   1615632 A   5/2005
EP   1533982 A2  5/2005
(Continued)

OTHER PUBLICATIONS

Rescorla et al. "SSLACC: A Clustered SSL Accelerator", Proceedings of the 11th USENIX Security Symposium, San Francisco, CA, Aug. 2001.*
(Continued)

*Primary Examiner* — Tae Kim
*Assistant Examiner* — Shiuh-Huei Ku
(74) *Attorney, Agent, or Firm* — John W. Branch; Lowe Graham Jones PLLC

(57) ABSTRACT

Securely transferring session credentials from a client-side traffic management device (TMD) to a second server-side TMD that replaces a first server-side TMD. A client-side TMD and the first server-side TMD have copies of secret data associated with an encrypted session between a client device and a server device. The first server-side TMD may be replaced with the second server-side TMD, which may not have the secret data. In response to a request to create an encrypted connection associated with the encrypted session, the client-side TMD encrypts the secret data using the server device's public key and transmits the encrypted secret data to the second server-side TMD. Using the server device's private key, the second server-side TMD decrypts the secret data and participates in the encrypted connection.

18 Claims, 10 Drawing Sheets

(51) Int. Cl.
*H04L 9/32* (2006.01)
*H04L 29/08* (2006.01)
*H04L 9/30* (2006.01)
*G06F 21/60* (2013.01)

(52) U.S. Cl.
CPC ............ *H04L 63/306* (2013.01); *H04L 67/14* (2013.01); *G06F 21/604* (2013.01); *H04L 67/28* (2013.01)

(56) References Cited

U.S. PATENT DOCUMENTS

| | | | |
|---|---|---|---|
| 5,412,730 A | 5/1995 | Jones | |
| 5,524,073 A | 6/1996 | Stambler | |
| 5,657,390 A | 8/1997 | Elgamal et al. | |
| 5,793,302 A | 8/1998 | Stambler | |
| 5,825,890 A | 10/1998 | Elgamal et al. | |
| 5,936,541 A | 8/1999 | Stambler | |
| 5,974,148 A | 10/1999 | Stambler | |
| 5,991,881 A | 11/1999 | Conklin et al. | |
| 6,052,785 A | 4/2000 | Lin et al. | |
| 6,061,454 A | 5/2000 | Malik et al. | |
| 6,084,969 A | 7/2000 | Wright et al. | |
| 6,094,485 A | 7/2000 | Weinstein et al. | |
| 6,104,716 A | 8/2000 | Crichton et al. | |
| 6,105,067 A | 8/2000 | Batra | |
| 6,134,584 A | 10/2000 | Chang et al. | |
| 6,175,869 B1 | 1/2001 | Ahuja et al. | |
| 6,212,636 B1 | 4/2001 | Boyle et al. | |
| 6,223,287 B1 | 4/2001 | Douglas et al. | |
| 6,367,009 B1 | 4/2002 | Davis et al. | |
| 6,374,300 B2 | 4/2002 | Masters | |
| 6,526,131 B1 | 2/2003 | Zimmerman et al. | |
| 6,546,423 B1 | 4/2003 | Dutta et al. | |
| 6,584,567 B1 | 6/2003 | Bellwood et al. | |
| 6,643,701 B1 | 11/2003 | Aziz et al. | |
| 6,658,114 B1 | 12/2003 | Farn et al. | |
| 6,674,717 B1 | 1/2004 | Duong-van et al. | |
| 6,681,327 B1 | 1/2004 | Jardin | |
| 6,704,798 B1 | 3/2004 | Mogul | |
| 6,718,388 B1 | 4/2004 | Yarborough et al. | |
| 6,724,893 B1 | 4/2004 | Petro | |
| 6,728,884 B1 | 4/2004 | Lim | |
| 6,732,269 B1 | 5/2004 | Baskey et al. | |
| 6,751,677 B1 | 6/2004 | Ilnicki et al. | |
| 6,799,270 B1 | 9/2004 | Bull et al. | |
| 6,918,041 B1 | 7/2005 | Chen | |
| 6,996,841 B2 | 2/2006 | Kadyk et al. | |
| 7,007,163 B2 | 2/2006 | Tardo et al. | |
| 7,010,608 B2 | 3/2006 | Garg et al. | |
| 7,017,049 B2 | 3/2006 | Hand et al. | |
| 7,043,632 B2 | 5/2006 | Chapman et al. | |
| 7,073,066 B1 | 7/2006 | Nessett | |
| 7,082,535 B1 | 7/2006 | Norman et al. | |
| 7,093,121 B2 | 8/2006 | Barton et al. | |
| 7,120,666 B2 | 10/2006 | McCanne et al. | |
| 7,136,997 B2 * | 11/2006 | Yamaguchi | H04W 12/06 455/433 |
| 7,137,143 B2 | 11/2006 | Chawla et al. | |
| 7,142,676 B1 | 11/2006 | Hillier et al. | |
| 7,146,505 B1 | 12/2006 | Harada et al. | |
| 7,149,892 B2 | 12/2006 | Freed et al. | |
| 7,174,565 B2 | 2/2007 | Kadyk et al. | |
| 7,219,120 B2 | 5/2007 | Hui | |
| 7,222,234 B2 | 5/2007 | Martin et al. | |
| 7,240,366 B2 | 7/2007 | Buch et al. | |
| 7,249,377 B1 | 7/2007 | Lita et al. | |
| 7,254,237 B1 | 8/2007 | Jacobson et al. | |
| 7,269,659 B2 | 9/2007 | Kadyk et al. | |
| 7,293,034 B2 | 11/2007 | Paya et al. | |
| 7,318,100 B2 | 1/2008 | Demmer et al. | |
| 7,343,398 B1 | 3/2008 | Lownsbrough | |
| 7,370,015 B2 | 5/2008 | Gvily | |
| 7,370,351 B1 | 5/2008 | Ramachandran et al. | |
| 7,401,159 B1 | 7/2008 | Aviani et al. | |
| 7,421,735 B2 | 9/2008 | Kerstens et al. | |
| 7,430,557 B1 | 9/2008 | Loboz et al. | |
| 7,430,755 B1 | 9/2008 | Hughes et al. | |
| 7,430,757 B1 | 9/2008 | Chari et al. | |
| 7,472,413 B1 | 12/2008 | Mowshowitz | |
| 7,493,383 B1 | 2/2009 | Mukerji | |
| 7,502,726 B2 | 3/2009 | Panasyuk et al. | |
| 7,506,368 B1 | 3/2009 | Kersey et al. | |
| 7,506,369 B2 | 3/2009 | Buch et al. | |
| 7,516,485 B1 | 4/2009 | Lee et al. | |
| 7,543,146 B1 | 6/2009 | Karandikar et al. | |
| 7,568,114 B1 | 7/2009 | Schlafly | |
| 7,584,505 B2 | 9/2009 | Mondri et al. | |
| 7,647,404 B2 | 1/2010 | Cooper et al. | |
| 7,661,131 B1 | 2/2010 | Shaw et al. | |
| 7,742,406 B1 | 6/2010 | Muppala | |
| 7,769,994 B2 | 8/2010 | Peles | |
| 7,770,007 B2 | 8/2010 | Bobde et al. | |
| 7,827,405 B2 | 11/2010 | Christiansen et al. | |
| 7,853,699 B2 | 12/2010 | Wu et al. | |
| 7,865,720 B2 | 1/2011 | Little et al. | |
| 7,890,751 B1 | 2/2011 | Morris et al. | |
| 7,895,446 B2 | 2/2011 | Harada et al. | |
| 7,904,949 B2 | 3/2011 | Bowers et al. | |
| 7,904,951 B1 | 3/2011 | Ebrahimi et al. | |
| 7,958,347 B1 | 6/2011 | Ferguson | |
| 7,979,555 B2 | 7/2011 | Rothstein et al. | |
| 7,984,160 B2 | 7/2011 | Lam | |
| 7,996,886 B1 | 8/2011 | Hughes et al. | |
| 8,001,371 B2 * | 8/2011 | Langer | H04L 9/0833 713/156 |
| 8,020,201 B2 | 9/2011 | Adusumilli et al. | |
| 8,176,186 B2 | 5/2012 | McCanne et al. | |
| 8,190,875 B2 | 5/2012 | Lev Ran et al. | |
| 8,225,085 B2 * | 7/2012 | Karandikar | 713/153 |
| 8,266,452 B2 | 9/2012 | Dunn et al. | |
| 8,452,956 B1 | 5/2013 | Kersey et al. | |
| 8,478,986 B2 | 7/2013 | Merugu et al. | |
| 8,615,795 B2 | 12/2013 | Cottrell et al. | |
| 8,650,389 B1 | 2/2014 | Thornewell et al. | |
| 2001/0037387 A1 | 11/2001 | Gilde et al. | |
| 2001/0047474 A1 | 11/2001 | Takagi et al. | |
| 2002/0016911 A1 | 2/2002 | Chawla et al. | |
| 2002/0023145 A1 | 2/2002 | Orr et al. | |
| 2002/0035681 A1 | 3/2002 | Maturana et al. | |
| 2002/0062372 A1 | 5/2002 | Hong et al. | |
| 2002/0069241 A1 | 6/2002 | Narlikar et al. | |
| 2002/0112152 A1 | 8/2002 | VanHeyningen et al. | |
| 2002/0138551 A1 | 9/2002 | Erickson | |
| 2002/0157019 A1 | 10/2002 | Kadyk et al. | |
| 2002/0163884 A1 | 11/2002 | Peles et al. | |
| 2002/0165928 A1 | 11/2002 | Landfeldt et al. | |
| 2002/0199095 A1 | 12/2002 | Bandini et al. | |
| 2002/0199098 A1 | 12/2002 | Davis | |
| 2003/0005280 A1 | 1/2003 | Bobde et al. | |
| 2003/0014628 A1 | 1/2003 | Freed et al. | |
| 2003/0014650 A1 | 1/2003 | Freed et al. | |
| 2003/0105810 A1 | 6/2003 | McCrory et al. | |
| 2003/0196084 A1 | 10/2003 | Okereke et al. | |
| 2003/0200332 A1 | 10/2003 | Gupta et al. | |
| 2003/0233539 A1 | 12/2003 | Tardo et al. | |
| 2004/0010596 A1 | 1/2004 | Hui | |
| 2004/0015725 A1 | 1/2004 | Boneh et al. | |
| 2004/0088542 A1 | 5/2004 | Daude et al. | |
| 2004/0123159 A1 | 6/2004 | Kersten et al. | |
| 2004/0210756 A1 | 10/2004 | Mowers et al. | |
| 2004/0215746 A1 | 10/2004 | McCanne et al. | |
| 2004/0243703 A1 | 12/2004 | Demmer et al. | |
| 2005/0001660 A1 | 1/2005 | Roy | |
| 2005/0008158 A1 | 1/2005 | Huh et al. | |
| 2005/0021956 A1 | 1/2005 | Genty et al. | |
| 2005/0044160 A1 | 2/2005 | McElligott | |
| 2005/0050316 A1 | 3/2005 | Peles | |
| 2005/0050362 A1 | 3/2005 | Peles | |
| 2005/0060426 A1 | 3/2005 | Samuels et al. | |
| 2005/0063303 A1 | 3/2005 | Samuels et al. | |
| 2005/0065799 A1 | 3/2005 | Dare et al. | |
| 2005/0074007 A1 | 4/2005 | Samuels et al. | |
| 2005/0081029 A1 | 4/2005 | Thornton et al. | |

(56) References Cited

U.S. PATENT DOCUMENTS

| | | |
|---|---|---|
| 2005/0086342 A1 | 4/2005 | Burt et al. |
| 2005/0108420 A1 | 5/2005 | Brown et al. |
| 2005/0108517 A1 | 5/2005 | Dillon et al. |
| 2005/0125553 A1 | 6/2005 | Wu et al. |
| 2005/0138353 A1 | 6/2005 | Spies et al. |
| 2005/0138359 A1 | 6/2005 | Simon et al. |
| 2005/0144463 A1 | 6/2005 | Rossebo et al. |
| 2005/0160161 A1 | 7/2005 | Barrett et al. |
| 2005/0187979 A1 | 8/2005 | Christensen et al. |
| 2005/0203849 A1 | 9/2005 | Benson |
| 2005/0240777 A1 | 10/2005 | Keohane et al. |
| 2005/0265235 A1 | 12/2005 | Accapadi et al. |
| 2005/0265327 A1 | 12/2005 | Buch et al. |
| 2005/0273850 A1 | 12/2005 | Freund |
| 2006/0005239 A1 | 1/2006 | Mondri et al. |
| 2006/0036755 A1 | 2/2006 | Abdullah et al. |
| 2006/0036859 A1 | 2/2006 | Adams et al. |
| 2006/0069719 A1 | 3/2006 | McCanne et al. |
| 2006/0075114 A1 | 4/2006 | Panasyuk et al. |
| 2006/0101510 A1 | 5/2006 | Kadyk et al. |
| 2006/0143700 A1 | 6/2006 | Herrmann |
| 2006/0143702 A1 | 6/2006 | Hisada et al. |
| 2006/0168210 A1 | 7/2006 | Ahonen et al. |
| 2006/0174106 A1 | 8/2006 | Bell et al. |
| 2006/0190612 A1 | 8/2006 | Kahol et al. |
| 2006/0209789 A1 | 9/2006 | Gupta et al. |
| 2006/0212524 A1 | 9/2006 | Wu et al. |
| 2006/0212935 A1 | 9/2006 | Burman et al. |
| 2006/0248194 A1 | 11/2006 | Ly et al. |
| 2006/0253703 A1 | 11/2006 | Eronen et al. |
| 2006/0259628 A1 | 11/2006 | Vadlapudi et al. |
| 2007/0038853 A1 | 2/2007 | Day et al. |
| 2007/0058807 A1 | 3/2007 | Marsh |
| 2007/0067834 A1 | 3/2007 | Saito |
| 2007/0074282 A1 | 3/2007 | Black et al. |
| 2007/0094373 A1 | 4/2007 | Brendel |
| 2007/0101412 A1 | 5/2007 | Yang et al. |
| 2007/0180227 A1 | 8/2007 | Akimoto |
| 2007/0180510 A1 | 8/2007 | Long et al. |
| 2007/0192845 A1 | 8/2007 | Lankheim |
| 2007/0198836 A1 | 8/2007 | Fedyk et al. |
| 2007/0199061 A1 | 8/2007 | Byres et al. |
| 2007/0266233 A1 | 11/2007 | Jethanandani et al. |
| 2008/0046714 A1 | 2/2008 | Suganthi et al. |
| 2008/0060055 A1 | 3/2008 | Lau |
| 2008/0065880 A1 | 3/2008 | Martin |
| 2008/0077982 A1 | 3/2008 | Hayler et al. |
| 2008/0101445 A1* | 5/2008 | Ho ............... H04L 29/12216 375/222 |
| 2008/0115200 A1 | 5/2008 | Olson et al. |
| 2008/0126794 A1 | 5/2008 | Wang et al. |
| 2008/0126801 A1 | 5/2008 | Lee et al. |
| 2008/0263215 A1 | 10/2008 | Schnellbaecher |
| 2008/0307219 A1 | 12/2008 | Karandikar |
| 2009/0013399 A1 | 1/2009 | Cottrell et al. |
| 2009/0070841 A1* | 3/2009 | Buga et al. ............ 725/116 |
| 2009/0073943 A1 | 3/2009 | Krishnaswamy et al. |
| 2009/0083537 A1 | 3/2009 | Larsen et al. |
| 2009/0083538 A1 | 3/2009 | Merugu et al. |
| 2009/0089862 A1 | 4/2009 | Sun |
| 2009/0113537 A1 | 4/2009 | Woo |
| 2009/0119504 A1 | 5/2009 | van Os et al. |
| 2009/0132807 A1 | 5/2009 | Schneider |
| 2009/0138577 A1* | 5/2009 | Casado et al. ............ 709/220 |
| 2009/0144408 A1 | 6/2009 | Wilf et al. |
| 2009/0220080 A1 | 9/2009 | Herne et al. |
| 2010/0031042 A1 | 2/2010 | Di Crescenzo et al. |
| 2010/0031337 A1 | 2/2010 | Black et al. |
| 2010/0037311 A1* | 2/2010 | He ............... H04L 63/0209 726/15 |
| 2010/0049970 A1 | 2/2010 | Fraleigh et al. |
| 2010/0071048 A1 | 3/2010 | Novak et al. |
| 2010/0115581 A1 | 5/2010 | Goldschlag et al. |
| 2010/0242097 A1 | 9/2010 | Hotes et al. |
| 2010/0242106 A1 | 9/2010 | Harris et al. |
| 2010/0299525 A1 | 11/2010 | Shah et al. |
| 2010/0325419 A1 | 12/2010 | Kanekar |
| 2010/0332672 A1 | 12/2010 | Abdullah et al. |
| 2011/0231649 A1 | 9/2011 | Bollay et al. |
| 2011/0231651 A1 | 9/2011 | Bollay |
| 2011/0231652 A1 | 9/2011 | Bollay et al. |
| 2011/0231655 A1 | 9/2011 | Bollay et al. |
| 2011/0231923 A1 | 9/2011 | Bollay et al. |

FOREIGN PATENT DOCUMENTS

| | | |
|---|---|---|
| JP | 2001-333110 A | 11/2001 |
| KP | 10-2006-0062356 A | 6/2006 |
| WO | 0103398 A2 | 1/2001 |
| WO | 0137068 A2 | 5/2001 |
| WO | 2004036360 A2 | 4/2004 |
| WO | 2005001660 A2 | 1/2005 |
| WO | 2005060202 A1 | 6/2005 |
| WO | 2007021483 A2 | 2/2007 |

OTHER PUBLICATIONS

"Application Switching Scaling Next-Generation Network," White Paper, Nortel Networks, Jan. 2008, 7 pages.

"RSA Security Certifies Array SSL Security Proxy and Integrated Web Traffic Manager; Array Products First in Class to Receive RSA BSAFE SSL-C Certification; Array Products to Include RSA BSAFE Cert-C Certificate Management Software," M2 Presswire, Goliath, Oct. 21, 2002, 2 pages.

"Introduction to Secure Sockets Layer," White Paper, Cisco Systems, Feb. 2003, 12 pages.

Lesniewski-Laas, C. et al., "SSL Splitting: Securely Serving Data from Untrusted Caches," 2003, 13 pages http://web.mit.edu/golem.Public/barnraising:usenix-security-2003.pdf.

Yaping, Y. et al., "Design and Implementation of SSL Based Secure Transmission System," Journal of Beijing University of Aeronautics and Astronautics, vol. 4, No. 27, Aug. 2001, 1 page.

"AARNet: Network: Large MTU: Programming—Nagle algorithm," accessed Dec. 9, 2005, 3 pages www.aamet.du.ay.engineering/networkdesign/mtu/programing.html.

Tormasov, A. et al., "TCP/IP Options for High-Performance Data Transmission," Builder.com, accessed Dec. 9, 2005, 4 pages http://builder.com.com/5100-6372-1050878.html.

"Wireless/Networking—Nagle algorithm," About.com, accessed Dec. 6, 2005, 2 pages http://compnetworking.about.com/od/tcpip/l/bldef_nagle.htm "Manpages—TCP," Section—Linux Programmer's Manual (7), Apr. 25, 1999, accessed Dec. 9, 2005, 6 pages www.fifi.org/cgi-bin/man2html/usr/share/man/man7/tcp.7.gz.

Nagle, J., "RFC 896—Congestion Control in IP/TCP Internetworks," Jan. 6, 1984, 13 pages www.faqs.org/rfcs/rfc896.html.

"PKCS #1 v2.0: RSA Cryptography Standard," RSA Laboratories, Oct. 1, 1998, pp. 1-35.

Berners-Lee, T. et al., "Hypertext Transfer Protocol—HTTP/1.0," RFC 1945, Network Working Group, May 1996, 60 pages.

Fielding, R. et al., "Hypertext Transfer Protocol—HTTP/1.1," RFC 2616, Network Working Group, Jun. 1999, 114 pages.

Kessler, G. et al., "A Primer on Internet and TCP/IP Tools," RFC 1739, Network Working Group, Dec. 1994, 46 pages.

Freier, A. O. et al., "The SSL Protocol," Netscape Communications Corporation, Version 3, Mar. 4, 1996, 60 pages.

Paxson, V. et al., "Known TCP Implementation Problems," RFC 2525, Except Network Working Group, Mar. 1999, 61 pages.

Rescorla, E., "SSL and TLS—Design and Building Secure Systems," Addison-Wesley, Mar. 2001, pp. 175-217.

"Nagle's algorithm—a Whatis.com definition," Nagle's Algorithm, accessed Decmber 6, 2005, 3 pages—searchnetworking.techtarget.com/sdefinition/0..sid7gci754347.00.html.

"OpenSSL—Welcome to the OpenSSL Project," The OpenSSL Project, 2005, 1 page.

(56) References Cited

OTHER PUBLICATIONS

"HTTP/1.1 and Nagle's Algorithm," W3C, w3.org, accessed Dec. 6, 2005, 3 pages http://www.w3.org/Protocols/HTTP/Performance/Nagle.
Dierks, T. et al., "The TLS Protocol, Version 1.0," RFC 2246, Network Working Group, Jan. 1999, 75 pages.
Rescorla, E., "Datagram Transport Layer Security," RFC 4347, Network Working Group, Apr. 2006, 26 pages.
Office Communication for U.S. Appl. No. 11/420,677 mailed Jul. 16, 2009.
Office Communication for U.S. Appl. No. 11/420,677 mailed Jan. 28, 2010.
Office Communication for U.S. Appl. No. 11/420,677 mailed Apr. 12, 2010.
Office Communication for U.S. Appl. No. 11/420,677 mailed Nov. 9, 2010.
Office Communication for U.S. Appl. No. 11/420,677 mailed Jun. 15, 2011.
Official Communication for U.S. Appl. No. 12/846,778 mailed Nov. 23, 2012.
Official Communication for U.S. Appl. No. 12/848,096 mailed Nov. 30, 2012.
Official Communication for U.S. Appl. No. 13/051,994 mailed Nov. 21, 2012.
Freier, A. O. et al., "The SSL Protocol, Version 3.0," Nov. 18, 1996, 63 pages.
Mittra, S., "Iolus: A Framework for Scalable Secure Multicasting," Proceedings of the ACM SIGCOMM '97, Sep. 14-18, 1997, 12 pages.
Official Communication for U.S. Appl. No. 11/420,677 mailed Sep. 14, 2012.
Official Communication for U.S. Appl. No. 12/846,778 mailed Aug. 7, 2012.
"BIG-IP e-Commerce Solutions Guide, version 4.5," F5 Networks, Feb. 27, 2010, 58 pages.
"BIG-IP Reference Guide version 4.5," F5 Networks, Feb. 27, 2010. 43 pages.
"BIG-IP Solutions Guide, version 4.5," F5 Networks, Feb. 23, 2010, 36 pages.
"Kerberos: The Network Authentication Protocol," MIT.edu, first released Feb. 24, 2000, 2 pages http://web.mit.edu/Kerberos.
"Kerberos (protocol)," Wikipedia.org, initially published Feb. 25, 2002, 5 pages http://en.wikipedia.org/wiki/kerberos_(protocol).
"Integrated Windows Authentication (IIS 6.0)," Microsoft TechNet, Jun. 23, 2003, 3 pages http://www.microsoft.com/technet/prodtechnol/WindowsServer2003/Library/IIS/523ae943-5e6a-4200-9103-9808baa00157.mspx?mfr=true.
"Manual: BIG-IP Reference Guide v4.6.2," F5 Networks, Feb. 23, 2010, 13 pages.
"Manual Chapter: BIG-IP version 4.6.2 Reference Guide: SSL Accelerator Proxies," F5 Networks, Feb. 23, 2010, 46 pages.
"Microsoft NTLM," Microsoft, Inc., build date Jul. 16, 2013, 2 pages http://msdn.microsoft.com/en-us/library/aa378749.aspx.
"NTLM," Wikipedia.org, initially publised Feb. 12, 2006, 5 pages http://en.wikipedia.org/wiki/NTLM.
"Release Note: BIG-IP Controller 4.5," F5 Networks, Oct. 30, 2002, 16 pages.
"Release Note: BIG-IP Version 4.6.2 Release Note," F5 Networks, Mar. 5, 2007, 36 pages.
Christensen, J. M., "Kerberos in a Sharepoint Environment," WindowSecurity.com, Jul. 30, 2008, 6 pages http://www.windowsecurity.com/articles/Kerberos-Sharepoint-Environment.html.
Dierks, T. et al., "The Transport Layer Security (TLS) Protocol, Version 1.2," RFC 5246, Network Working Group, Aug. 2008, 104 pages.
Glass, E., "The NTLM Authentication Protocol and Security Support Provider," SourceForge.net, 2003, 95 pages http://davenport.sourceforge.net/ntlm.html.
Malkhi, D. et al., "Fairplay—A Secure Two-Party Computation System" Proceedings of the 13th USENIX Security Symposium, Aug. 9-13, 2004, 22 pages.
Pfitzmann, B. et al., "A Model for Asyncronous Reactive Systems and its Application to Secure Message Transmission," Proceedings of the 2001 IEEE Symposium on Security and Privacy, May 2001, 17 pages.
Reid, B. et al., "Improving the Performance of IIS 6.0 Applications," TechNet Blogs, The Industry Insiders, Jul. 15, 2005, 3 pages http:/blogs.technet.com/b/industry_insiders/archive/2005/07/15/407751.aspx.
Tschalär, R. et al., "NTLM Authentication Scheme for HTTP," Jun. 17, 2003, 5 pages http://www.innovation.ch/personal/ronald/ntlm.html.
Zhu et al., "Splendor: A Secure, Private, and Location-aware Service Discovery Protocol Supporting Mobile Services," Proceedings of the First IEEE International Conference on Pervasive Computing and Communication (PerCom'03), Mar. 2003, pp. 235-242.
Official Communication for U.S. Appl. No. 11/420,677 mailed Jun. 6, 2013.
Official Communication for U.S. Appl. No. 12/848,096 mailed Jul. 9, 2013.
Official Communication for U.S. Appl. No. 13/052,005 mailed Jul. 16, 2013.
International Search Report and Written Opinion for International Patent Application No. PCT/US2011/029079 mailed Oct. 31, 2011.
International Preliminary Report on Patentability for International Patent Application No. PCT/US2011/029079 mailed Oct. 4, 2012.
Official Communication for U.S. Appl. No. 13/052,005 mailed Feb. 1, 2013.
Official Communication for U.S. Appl. No. 13/051,994 mailed Mar. 14, 2013.
Official Communication for U.S. Appl. No. 12/846,778 mailed Sep. 16, 2013.
Official Communication for U.S. Appl. No. 13/051,963 mailed Sep. 26, 2013.
Official Communication for U.S. Appl. No. 11/420,677 mailed Apr. 25, 2012.
Official Communication for U.S. Appl. No. 12/486,778 mailed Aug. 7, 2012.
Official Communication for U.S. Appl. No. 13/052,005 mailed Nov. 27, 2013.
Martin, Franck. "SSL Certificates HOWTO.", pp. 1-36, Oct. 20, 2002. http://www.tldp.org/HOWTO/SSL-Certificates-HOWTO/.
Cisco Whitepaper—"Cisco Application Networking for IBM WebSphere", pp. 1-10, 1992-2007. https://www.cisco.com/application/pdf/en/us/guest/netsol/ns432/c649/ccmigration_09186a0080908167.pdf.
Official Communication for U.S. Appl. No. 11/420,677 mailed Nov. 6, 2013.
Office Communication for U.S. Appl. No. 11/420,677 mailed on Nov. 6, 2013.
Office Communication for U.S. Appl. No. 13/052,005 mailed on Nov. 27, 2013.
Office Communication for U.S. Appl. No. 12/848,096 mailed on Jun. 20, 2014.
Office Communication for U.S. Appl. No. 13/051,994 mailed on May 22, 2014.
Office Communication for U.S. Appl. No. 13/779,530 mailed on Aug. 6, 2014.
Office Communication for U.S. Appl. No. 11/420,677 mailed on Mar. 12, 2014.
Office Communication for U.S. Appl. No. 13/051,963 mailed on Jun. 27, 2014.
Office Communication for U.S. Appl. No. 12/846,778 mailed on Jan. 31, 2014.
Office Communication for U.S. Appl. No. 13/052,005 mailed on Jun. 30, 2014.
Office Communication for U.S. Appl. No. 13/051,994 mailed on Oct. 10, 2014.
Office Communication for U.S. Appl. No. 13/051,963 mailed on Oct. 17, 2014.

(56) References Cited

OTHER PUBLICATIONS

Office Communication for U.S. Appl. No. 13/779,530 mailed on Nov. 17, 2014.
Martin, Franck "SSL Certificated HOWTO.", pp. 1-36, Oct. 20, 2002. URL: http://www.tldp.org/HOWTO/SSL-Certificates-HOWTO/ (Mar. 14, 2003).
Cisco Whitepaper—"Cisco Application Networking for IBM WebSphere", pp. 1-10, 1992-2007. http://www.cisco.com/application/pdf/en/us/guest/netscl/ns432/c649/ccmigration_09186a0080908167.pdf.
SiteCelerate Whitepaper—pp. 1-9, 2005. http://www.arahe.com/webaccelerate/sc_wp.pdf.
Office Communication for U.S. Appl. No. 13/051,994 mailed on Feb. 26, 2015.
Office Communication for U.S. Appl. No. 13/779,530 mailed on Mar. 2, 2015.
Office Communication for U.S. Appl. No. 12/848,096 mailed on Mar. 13, 2015.
Office Communication for U.S. Appl. No. 13/052,005 mailed on Mar. 30, 2015.
Office Communication for Japanese Application No. 2013-501341 mailed on Dec. 15, 2014, 4 pages.
SSLVPN Vulnerabilities—Client Certificates offer a superior defense over OTP devices, http://www.networkworld.com/community/node/31124, Apr. 6, 2010, 5 pages.
Hess et al., "Advanced Client/Server Authentication in TLS," in Proceedings of the Network and Distributed System Security Symposium (NDSS), 2002, 12 pages.
Office Communication for U.S. Appl. No. 13/052,005 mailed on Dec. 19, 2014.
Office Communication for U.S. Appl. No. 12/848,096 mailed on Dec. 18, 2014.
Office Communication for U.S. Appl. No. 13/051,963 mailed on Feb. 2, 2015.
Official Communication for U.S. Appl. No. 14/320,331 mailed on Mar. 28, 2016, 18 pages.
Official Communication for U.S. Appl. No. 14/851,783 mailed on Mar. 11, 2016, 5 pages.
Official Communication for U.S. Appl. No. 14/791,129 mailed on Jun. 10, 2016, 13 pages.
Official Communication for U.S. Appl. No. 14/856,127 mailed on Jun. 17, 2016, 9 pages.
European Search Report for European Patent Application No. 11757098,6, mailed on Jun. 12, 2015.
Office Communication for U.S. Appl. No. 13/051,963 mailed on Jun. 8, 2015.
Office Communication for U.S. Appl. No. 13/779,530 mailed on Jun. 17, 2015.
Office Communication for U.S. Appl. No. 13/051,994 mailed on Jun. 22, 2015.
Office Communication for U.S. Appl. No. 12/848,096 mailed on Aug. 7, 2015.
Office Communication for U.S. Appl. No. 14/320,331 mailed on Aug. 14, 2015.

\* cited by examiner

SECURE DISTRIBUTION OF SESSION CREDENTIALS FROM CLIENT-SIDE TO SERVER-SIDE TRAFFIC MANAGEMENT DEVICES

CROSS REFERENCE TO RELATED APPLICATION

This application claims the benefit of U.S. Provisional Application, titled "Proxy SSL Handoff Via Mid-Stream Renegotiation" Ser. No. 61/315,857 filed on Mar. 19, 2010, the benefit of which is hereby claimed under 35 U.S.C. §119(e), and which is further incorporated herein by reference.

TECHNICAL FIELD

The present invention relates generally to managing network communications, and more particularly, but not exclusively, to securely transferring session credentials from a client-side traffic management device (TMD) to a second server-side TMD that replaces a first server-side TMD.

TECHNICAL BACKGROUND

An increasing number of applications within an enterprise are provided over Secure Sockets Layer (SSL), Transport Layer Security (TLS), or any number of protocols that network devices may use to communicate over an encrypted session. Maintaining security while increasing performance and reliability of such encrypted sessions is of practical benefit to end users, system administrators, infrastructure providers, and the like.

However, traditional methods of optimizing data transfer between two network devices are often rendered inoperable when two network devices, such as a client device and a server device, encrypt the data being transferred. For example, a pair of network accelerators, one operating in physical proximity to the client device and the other in physical proximity to the server device, are traditionally unable to perform certain types of compression on the encrypted data. Moreover, such pairs of network accelerators are also traditionally unable to insert content or otherwise modify the encrypted data, redirect data requests to particular servers, or the like. Thus, increasing the reliability and availability of proxy SSL/TSL sessions is an ongoing challenge.

One obstacle to reliability of such proxy SSL/TLS sessions is intermittent availability of network devices, including client-side and server-side network accelerators. Scheduled or unscheduled down-time of client-side and/or server-side network accelerators may result in a loss of data associated with an established proxy SSL/TLS session, often requiring the client device and server device negotiate a new SSL/TLS session.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the described embodiments, reference will be made to the following Detailed Description, which is to be read in association with the accompanying drawings, wherein.

DETAILED DESCRIPTION

Figure 1:
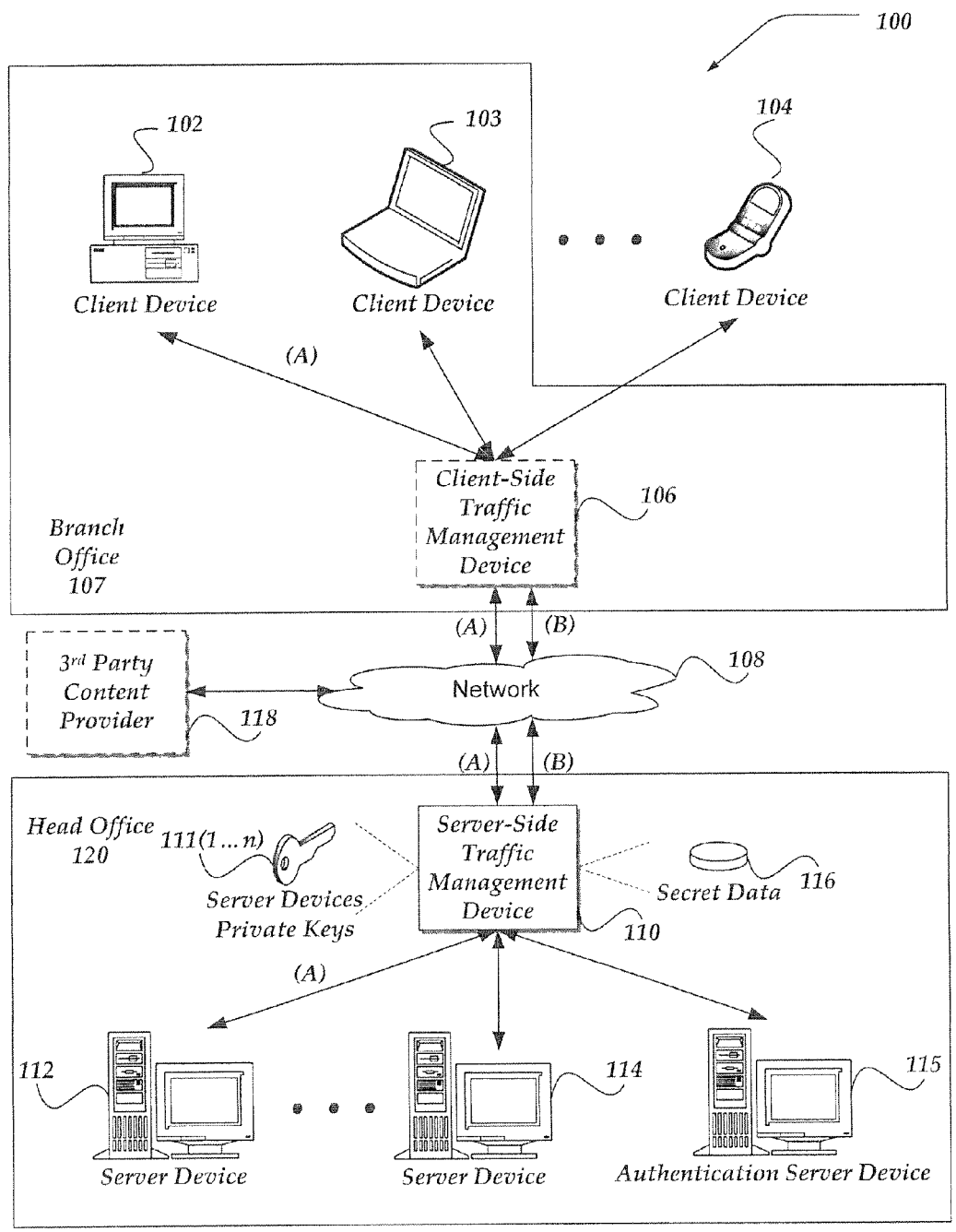
FIG. 1 illustrates a functional block diagram illustrating an environment for practicing various embodiments.

In the following detailed description of exemplary embodiments, reference is made to the accompanied drawings, which form a part hereof, and which show by way of illustration examples by which the described embodiments may be practiced. Sufficient detail is provided to enable those skilled in the art to practice the described embodiments, and it is to be understood that other embodiments may be utilized, and other changes may be made, without departing from the spirit or scope. Furthermore, references to "one embodiment" are not required to pertain to the same or singular embodiment, though they may. The following detailed description is, therefore, not to be taken in a limiting sense, and the scope of the described embodiments is defined only by the appended claims.

Throughout the specification and claims, the following terms take the meanings explicitly associated herein, unless the context clearly dictates otherwise. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, application layer refers to layer 7 of the seven-layer protocol stack as defined by the ISO-OSI (International Standards Organization-Open Systems Interconnection) framework.

As used herein, the term "network connection" refers to a collection of links and/or software elements that enable a computing device to communicate with another computing device over a network. One such network connection may be a Transmission Control Protocol (TCP) connection. TCP connections are virtual connections between two network nodes, and are typically established through a TCP handshake protocol. The TCP protocol is described in more detail in Request for Comments (RFC) 793, available from the Internet Engineering Task Force (IETF), and is hereby incorporated by reference in its entirety. A network connection "over" a particular path or link refers to a network connection that employs the specified path or link to establish and/or maintain a communication. The term "node" refers to a network element that typically interconnects one or more devices, or even networks.

As used herein, including the claims, the term "SSL" refers to SSL, TLS, Datagram Transport Layer Security (DTLS) and all secure communications protocols derived therefrom. The SSL protocol is described in Netscape Communications Corp, *Secure Sockets Layer (SSL) version* 3 (November 1996), and the TLS protocol is derived from SSL, and is described in Dierks, T., and Allen, C., "The TLS Protocol Version 1.0," RFC 2246 (January 1999), available from the IETF. The DTLS protocol is based on the TLS protocol, and is described in Rescorla, E., and Modadugu, N., "Datagram Transport Layer Security," RFC 4347 (April 2006), available from the IETF. Each of these documents is incorporated herein by reference in their entirety. An SSL connection is a network connection that is secured by cryptographic information derived from an SSL protocol. The SSL protocol operates between an application layer (such as one or more of OSI layers 5-7) and a transport layer (such as OSI layer 4). The SSL protocol may provide security for application layer protocols such as HyperText Transfer Protocol (HTTP), Lightweight Directory Access Protocol (LDAP), Internet Messaging Access Protocol (IMAP), or the like. For example, HTTP over SSL (HTTPS) utilizes the SSL protocol to secure HTTP data. The SSL protocol may utilize Transport Control Protocol/Internet Protocol (TCP/IP) on behalf of the application layer protocols to transport secure data. The SSL protocol may also employ a certificate. In one embodiment, the certificate is an X.509 certificate, such as those described in RFC 2459, available from the IETF, which is also incorporated herein by reference.

As used herein, an SSL session refers to a secure session over a network between two endpoints, wherein the session is secured using the SSL protocol. Although an SSL session is generally described herein as being established between a client device and a server device over a network, it should be understood that an SSL session may be established between virtually any types of network devices enabled to employ the SSL protocol. The SSL protocol uses a series of SSL handshakes (i.e. an SSL handshake protocol) to initiate an SSL session. An SSL session is associated with a master secret (also known as a session key) that results from the SSL handshakes. An SSL session is further associated with additional secret data that enables the SSL session (e.g. pre-master secret, random data, server's public and private keys and/or client's public and private keys). The SSL protocol also includes an SSL re-handshake procedure for renegotiating an SSL session. The renegotiated SSL session may be associated with the current SSL session or with another SSL session. An SSL session may employ one or more underlying network connections.

As used herein, the term SSL connection refers to a network connection employed by an SSL session to transmit encrypted data. An SSL connection is created at the request of a client device or a server device that are endpoints of an established SSL session. Regardless of which device requests the SSL connection, one or more keys used to encrypt/decrypt data transmitted over the SSL connection are independently derived by the client device and the server device based on the master secret of the associated SSL session.

Briefly, SSL supports at least four content types: application_data, alert, handshake, and change_cipher_spec. Alert, handshake, and change_cipher_spec content types are associated with messages for managing the SSL protocol. For example, an SSL alert is of the alert content type and is used for signaling, among other things, error conditions. SSL has provisions for other content types, but these capabilities are not commonly used.

The SSL handshake protocol includes the exchange and processing of a series of messages, which may be one of an alert, handshake, and/or change_cipher_spec content type. One or more SSL handshake messages are encapsulated within one or more network records of the handshake content type. The SSL handshake message also includes an associated SSL handshake type, and one or more data fields.

The SSL handshake protocol typically begins with the client device sending to the server device, among other things, randomly generated data within a CLIENT-HELLO message (e.g. an SSL handshake message with an associated SSL handshake type of "CLIENT-HELLO"). The server device responds to the CLIENT-HELLO message with, among other things, randomly generated data within a SERVER-HELLO message. Further, the server may provide a server certificate which the client may use to authenticate the server. Moreover, in some embodiments the server may request a client certificate which the server may authenticate in order to validate the client.

The client device, using the randomly generated data exchanged in the CLIENT-HELLO and SERVER-HELLO messages, generates a pre-master secret for an SSL session. In one embodiment, the client device may also include another random number in the pre-master secret, one that has typically not been transmitted over a public network in the clear. The client device then sends the pre-master secret to the server device in an SSL handshake message. In one embodiment, the pre-master secret may be encrypted using a public key associated with the server (obtained from the server's SERVER-HELLO message). Typically, the SSL handshake message that includes the pre-master secret is a CLIENT-KEY-EXCHANGE handshake message. Then, each of the client device and the server device, separately, perform a series of steps to generate a master secret using the pre-master secret. This master secret is associated with the SSL session, and is also known as a session key. Once an SSL session has been established, either the client device or the server device may requests that an SSL connection be created. Creation of an SSL session includes independently generating a key at both the client device and the server device based on the shared master secret. Connection keys may include, but are not limited to, cipher keys used to encrypt and decrypt communicated data over the SSL session, and/or authentication keys used verify messages received over the SSL session. The client device and the server device may then use their respective instances of the connection key(s) to generate and send messages containing encrypted payloads to each other.

As used herein, including the claims, the term "encrypted session" refers to a communications session between two endpoint devices over a network, encrypted in some way so as to secure the session. Example encrypted sessions may include SSL, TLS, and DTLS sessions. An encrypted session is associated with a master secret, also known as a session key. As used herein, the term "encrypted connection" refers to any network connection secured by cryptographic information, such as SSL, TLS, and DTLS connections, although other encrypted connections are similarly contemplated. An encrypted connection includes cipher keys used to encrypt and decrypt data communicated over the encrypted connection, as well as a reference to an underlying transport protocol interface, such as a TCP interface.

As used herein, the phrase "encrypted session/connection" refers an encrypted session and/or an encrypted connection.

As used herein, the phrase "end-to-end encrypted session/connection" refers to an encrypted session and/or connection between two endpoint devices. In some instances, each endpoint device may know the identity of the other endpoint device when establishing the encrypted session/connection.

As used herein, the phrase "terminating an encrypted session" refers to being one of the two endpoints of an encrypted session. Similarly, the phrase "terminating an encrypted connection" refers to being one of the two endpoints of an encrypted connection. The endpoints of an encrypted session or connection are devices, such as a client device and a server device, between which encrypted data may be transmitted. Examples of a client device and a server device are an SSL client device and an SSL server device.

As used herein, the phrase "establishing an encrypted session" refers to participating in an encrypted session handshake protocol. The phrase "establishing an encrypted connection" refers to generating an encrypted connection associated with an encrypted session by participating in an abridged handshake protocol. In one embodiment, two devices establish the encrypted session/connection, becoming the endpoints of the encrypted session/connection. Additional devices also may optionally participate in establishing the encrypted session/connection, either in conjunction with one or both of the endpoints, or without the knowledge of one or both endpoints. One example of an encrypted session handshake protocol is an SSL handshake protocol.

As used herein, the phrase "abridged handshake protocol" refers to a negotiation between a client device and a server device used to create a new encrypted connection that is associated with an established encrypted session. The request may be made by either the client device or the server device. The request may occur at any time after the encrypted session has been established. In one embodiment, both devices participating in the abridged handshake protocol independently generate a connection key based on the session key of the established encrypted session.

As used herein, the phrase "out-of-band" refers to sending data outside of a current encrypted session/connection, such as sending the data over a connection distinct from an end-to-end encrypted session/connection established between a client device and a server device.

As used herein, the phrase "secret data" refers to data that enables an encrypted session handshake between two devices. Secret data includes, for example, a master secret and a pre-master secret as described in RFC 2246, referenced above. Secret data may also include the random data employed to generate the pre-master secret, nonces, PKI private keys for server and/or client, and the like.

As used herein, the term "packet" refers to a group of binary digits which is switched and transmitted as a composite whole. A "network packet" is a packet that is switched and transmitted over a network from a source toward a destination. As used herein, the terms "packet header" and "header" refer to contiguous bits at the start of a packet that carry information about the payload data of the packet. For example, a header may include information regarding a format, protocol, source, destination, type, and/or sequence of payload data in a packet, and/or any other type of control information necessary for the sending, receiving and/or processing of the payload data in a packet. As used herein, "packet payload" and "payload" refer to data included within a packet, and distinct from a packet header of the packet. The payload may include data that is to be transferred from source toward a destination, and such data may be in a particular format described in the header.

Identification of header and payload within a packet may be context relevant, and related to a relevant layer of the OSI stack. For example, a packet may be analyzed by a lower-level process operating at a lower level of the OSI stack, such as the transport layer. Such a lower-level process may identify a transport-layer header and transport-layer payload within the packet, and may strip the transport-layer header from the packet in the course of receiving and analyzing the packet. The identified payload data from the packet may then be transferred to a higher-level process operating at a higher level of the OSI stack, such as at the application layer, which may identify an application layer header and application layer payload within the transferred data. Thus, both header and payload relevant to a higher level of processing (e.g. application layer) may be included in payload data relevant to a lower level of processing (e.g. transport layer).

Throughout this disclosure, when specific message types are listed, such as "CLIENT-HELLO", it is understood that these are examples used to illustrate a type of message. These specific messages are but one embodiment, and other similar messages used to establish and/or maintain an encrypted session/connection are similarly contemplated.

In some embodiments, server-side TMD and client-side TMD may be distinguished by their relative positions within a system topology, and/or their physical locations. For example, as shown in FIG. 1, a client-side TMD may be closer to a client device physically (e.g. co-located within branch office 107 with client device(s)) and/or topologically (e.g. requiring relatively fewer network hops for traffic to reach a client device than a server device). Similarly, a server-side TMD may be closer to a server device physically (e.g. co-located within head office 120) or topologically.

Throughout this disclosure, including the claims, an untrusted TMD refers to a TMD that is not under the physical and/or administrative control of a head office. For example, a client-side TMD residing in a branch office will often be regarded as untrusted, as branch offices typically do not provide as high a level of physical or administrative security as does a head office.

Throughout this disclosure, including the claims, an "unknown TMD" refers to a TMD which may or may not be in possession of server secret data, such as a server device's private key, digital certificate, or the like.

The claimed invention may be practiced in an environment in which a client-side TMD and a first server-side TMD are interposed between a client device and a server device, such that one or both of the TMDs have access to the session key(s) and/or connection key(s) required to decrypt encrypted data sent between the client device and the server device. What follows is a brief, non-limiting, non-exemplary description of how the first server-side TMD and the client-side TMD may reach this state. As described, the first server-side TMD is interposed between the client device and the server device. During establishment of an end-to-end encrypted session between the client device and the server device, the interposed TMD accesses secret information about the encrypted session. Such secret information includes, for example, client device and server device random data, a pre-master secret usable to determine a session key, a server certificate, a client certificate, and the like. By accessing the secret information for the end-to-end encrypted session, the first server-side TMD is able to read, intercept, augment, delete, delay, prune, compress, enhance, accelerate, transpose, or otherwise modify data sent over encrypted connections associated with the encrypted connection.

In one embodiment, once the end-to-end encrypted session has been established and the first server-side TMD has access to the session key, the first server-side TMD may transmit the session key and other secret data (including the pre-master secret, client and server random data, server certificate, and the like) to the client-side TMD, thereby enabling the client-side TMD to also decrypt encrypted data transmitted over encrypted connections associated with the encrypted session. In one embodiment, once both the client-side TMD and the first server-side TMD have access to the session keys, the client-side TMD and the server-side TMD may be used in conjunction to enhance or otherwise modify data transmitted between the client device and the server device.

Briefly described is a mechanism for securely transferring session credentials from a client-side traffic management device (TMD) to a second server-side TMD that replaces a first server-side TMD. In one embodiment, a client-side TMD and the first server-side TMD have copies of secret data associated with an encrypted session between a client device and a server device, including a session key. For any of a variety of reasons, the first server-side TMD is replaced with the second server-side TMD, which does not have the secret data. In response to a request to create an encrypted connection associated with the encrypted session, the client-side TMD encrypts the secret data using the server device's public key and transmits the encrypted secret data to the second server-side TMD, the second server-side TMD has a copy of the server device's private key, then the second sever-side TMD decrypts the secret data and participates in the encrypted connection.

Illustrative Operating Environment

FIG. 1 shows components of an illustrative environment 100 in which the described embodiments may be practiced. Not all the components may be required to practice the described embodiments, and variations in the arrangement and type of the components may be made without departing from the spirit or scope of the described embodiments. Environment 100 of FIG. 1 includes client devices 102-104, client-side TMD 106, branch office 107, network 108, server-side TMD 110, end-to-end encrypted session (A) and secure tunnel (B) through network 108, private keys 111(1) through 111(n), server devices 112 through 114, authentication server device 115, secret data 116, third party content provider 118, and head office 120. Server devices 112-114 (server device 113 not shown) and authentication server device 115 are collectively referred to herein as server devices 112-115.

Generally, client devices 102-104 may include virtually any computing device capable of connecting to another computing device and receiving information. Client devices 102-104 may be located within the branch office 107, but client devices 102-104 may alternatively be located outside of branch office 107. Such devices may include personal computers, multiprocessor systems, microprocessor-based or programmable consumer electronics, network devices, and the like. Client devices 102-104 may also include portable devices such as, cellular telephones, smart phones, display pagers, radio frequency (RF) devices, infrared (IR) devices, Personal Digital Assistants (PDAs), handheld computers, wearable computers, tablet computers, integrated devices combining one or more of the preceding devices, and the like. As such, client devices 102-104 may range widely in terms of capabilities and features.

Client devices 102-104 may further include one or more client applications that are configured to manage various actions. Moreover, client devices 102-104 may also include a web browser application that is configured to enable an end-user to interact with other devices and applications over network 108.

Network 108 is configured to couple network enabled devices, such as client devices 102-104, TMDs 106 and 110, server devices 112-114, authentication server device 115, and third party content provider 118, with other network enabled devices. In one embodiment, client device 102 may communicate with server device 112 through client-side TMD 106, network 108, and server-side TMD 110. Additionally or alternatively, client device 102, client-side TMD 106, server-side TMD 110, and server device 112 may all be connected directly to network 108. In one embodiment, network 108 may enable encrypted sessions, such as end-to-end encrypted session (A), between client devices 102-104 and server devices 112-115.

Network 108 is enabled to employ any form of computer readable media for communicating information from one electronic device to another. In one embodiment, network 108 may include the Internet, and may include local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include fiber optics, twisted wire pair, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 108 may further employ a plurality of wireless access technologies including, but no limited to, 2nd (2G), 3rd (3G), 4th (4G) generation radio access for cellular systems, Wireless-LAN, Wireless Router (WR) mesh, and the like. Access technologies such as 2G, 3G, 4G, and future access networks may enable wide area coverage for network devices, such as client devices 102-104, or the like, with various degrees of mobility. For example, network 108 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices could be remotely connected to either LANs or WANs via a modem and temporary telephone link, a DSL modem, a cable modem, a fiber optic modem, an 802.11 (Wi-Fi) receiver, and the like. In essence, network 108 includes any communication method by which information may travel between one network device and another network device.

Secure tunnel (B) through network 108 includes any tunnel for communicating information between network devices. Typically, secure tunnel (B) is encrypted. As used herein, a "tunnel" or "tunneled connection" is a network mechanism that provides for the encapsulation of network packets or frames at a same or lower layer protocol of the Open Systems Interconnection (OSI) network stack. Tunneling may be employed to take packets or frames from one network system and place (e.g. encapsulate) them inside frames from another network system. Examples of tunneling protocols include, but are not limited to IP tunneling, Layer 2 Tunneling Protocol (L2TP), Layer 2 Forwarding (L2F), VPNs, IP SECurity (IPSec), Point-to-Point Tunneling Protocol (PPTP), GRE, MBone, and SSL/TLS. As shown, secure tunnel (B) is created for secure connections between client-side TMD 106 and server-side TMD 110 through network 108.

One embodiment of a network device that could be used as client-side TMD 106 or server-side TMD 110 is described in more detail below in conjunction with FIG. 2. Briefly, however, client-side TMD 106 and server-side TMD 110 each include virtually any network device that manages network traffic. Such devices include, for example, routers, proxies, firewalls, load balancers, cache devices, application accelerators, devices that perform network address translation, any combination of the preceding devices, or the like. Such devices may be implemented solely in hardware or in hardware and software. For example, such devices may include some application specific integrated circuits (ASICs) coupled to one or more microprocessors. The ASICs may be used to provide a high-speed switch fabric while the microprocessors may perform higher layer processing of packets.

In one embodiment, server-side TMD 110 is typically located within head office 120, and as such is considered to be physically secure and under the direct management of a central administrator. Accordingly, sever-side TMD 110 may also be known as a trusted TMD. Server-side TMD 110 may control, for example, the flow of data packets delivered to, or forwarded from, an array of server device devices, such as server devices 112-115. In one embodiment, messages sent between the server-side TMD 110 and the server devices 112-115 may be part of a secure channel, such end-to-end encrypted session (A) formed between one of client devices 102-104 and one of the server devices 112-115. In another embodiment, server-side TMD 110 may terminate an encrypted connection on behalf of a server device, and employ another type of encryption, such as IPSec, to deliver packets to or forward packets from the server device. Alternatively, when the server-side TMD 110 terminates the encrypted connection on behalf of a server device, delivering packets to or forwarding packets from the server device may be performed with no encryption (or "in the clear").

In one embodiment, client-side TMD 106 typically resides in branch office 107, physically outside the control of central administrators, and therefore may be subject to physical tampering. Accordingly, client-side TMD 106 may be known as an untrusted TMD. In one embodiment, client-side TMD 106 may forward data from a source to a destination. For example, client-side TMD 106 may forward one or more encrypted session handshake messages between one of client devices 102-104 and one of server devices 112-115. Alternatively, a client-side TMD may reside in the head office 120. Alternatively, a client-side TMD may be included with a server-side TMD in a single device, enabling a single device to provide the services of both a client-side TMD and a server-side TMD, based on the types and locations of devices transmitting data through the TMD. Alternatively or additionally, a TMD may act as both a client-side TMD and a server-side TMD for a single connection. For example, a TMD may act as a client-side TMD by routing a request to a server-side TMD in another office. However, the server-side TMD may re-route the request to a server device located in geographic proximity to the "client-side" TMD. In this case, the "client-side" TMD may connect the client device to the local server device. When connecting the client device to a local server device, the TMD that began as a "client-side" TMD may perform the role of a "server-side" TMD.

As described in more detail below, client-side TMD 106 may receive secret data 116, typically from server-side TMD 110, that enables it to perform various additional actions on encrypted connection messages sent between one of client devices 102-104 and one of server devices 112-115. For example, client-side TMD 106 may be enabled to read, intercept, augment, delete, prune, compress, delay, enhance, transpose, or otherwise modify data within an encrypted connection message.

In one embodiment, server device private keys 111 may be centralized inside of the head office 120, a Federal Information Processing Standard (FIPS) boundary, or the like. Server-side TMD 110 may be enabled to access the private keys 111, or the like, through a variety of mechanisms.

Server devices 112-115 may include any computing device capable of communicating packets to another network device. Each packet may convey a piece of information. A packet may be sent for handshaking, e.g., to establish a connection or to acknowledge receipt of data. The packet may include information such as a request, a response, or the like. Generally, packets received by server devices 112-115 may be formatted according to TCP/IP, but they could also be formatted using another protocol, such as SCTP, X.25, NetBEUI, IPX/SPX, token ring, similar IPv4/6 protocols, and the like. Moreover, the packets may be communicated between server devices 112-115, server-side TMD 110, and one of client devices 102-104 employing HTTP, HTTPS, and the like.

In one embodiment, server devices 112-115 are configured to operate as a website server. However, server devices 112-115 are not limited to web server devices, and may also operate a messaging server, a File Transfer Protocol (FTP) server, a database server, content server, and the like. Additionally, each of server devices 112-115 may be configured to perform a different operation. Thus, for example, server device 112 may be configured as a messaging server, while server device 114 is configured as a database server. Moreover, while server devices 112-115 may operate as other than a website, they may still be enabled to receive an HTTP communication.

Devices that may operate as server devices 112-115 include personal computers, desktop computers, multiprocessor systems, microprocessor-based or programmable consumer electronics, network PCs, server devices, and the like.

As discussed above, secret data 116 typically includes a pre-master secret and/or a master secret. Secret data 116 may also include random numbers, e.g. nonces (number used once). In one embodiment, a client device and a server device may exchange nonces in their respective HELLO messages, for use in generating the session key (also known as the master key). Additionally or alternatively, secret data 116 may include another nonce (distinct from the nonce's contained in HELLO messages) generated by the client device and digitally encrypted by the client device using the public key of the server device. In one embodiment, secret data 116 is utilized by one or more of the client device, server-side TMD 110, and the server device to generate a session key.

Third party content provider 118 may optionally be used to provide content, for example advertisements, to be inserted by server-side TMD 110 or client-side TMD 106 into an encrypted connection. However, third party content is not so limited, and may additionally include content provided by an affiliated business partner, a corporate IT department, and the like.

It is further noted that terms such as client and server may refer to functions within a device. As such, virtually any device may be configured to operate as a client, a server, or even include both a client and a server function. Furthermore, where two or more peers are employed, any one of them may be designated as a client or as a server, and be configured to confirm to the teachings of the present invention.

Illustrative Network Device Environment

Figure 2:
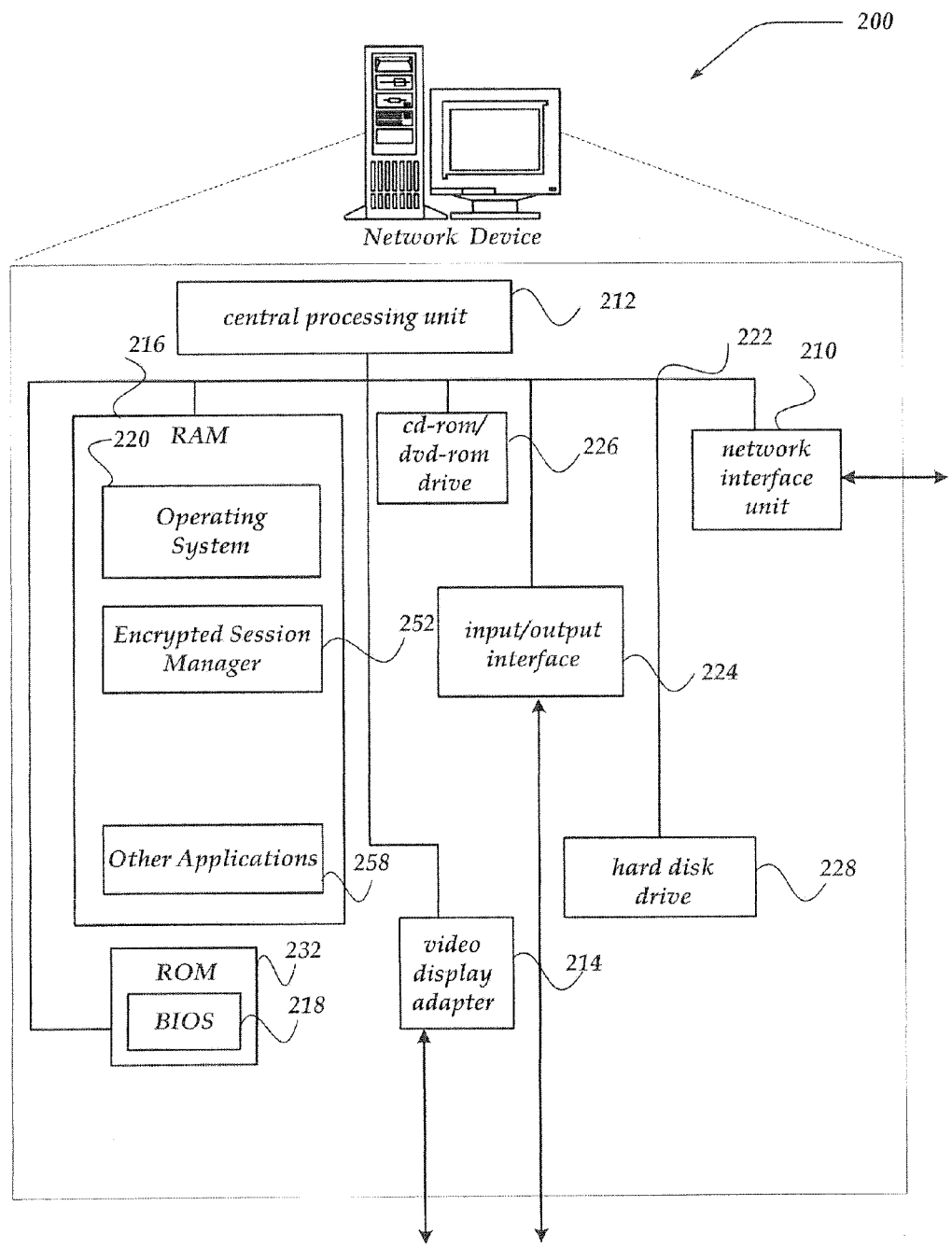
FIG. 2 illustrates one embodiment of a network device that may be included in a system implementing various embodiments.

FIG. 2 shows one embodiment of a network device, according to one embodiment of the invention. Network device 200 may include many more or less components than those shown. The components shown, however, are sufficient to disclose an illustrative embodiment for practicing the invention. Network device 200 may represent, for example, server-side TMD 110 and/or client-side TMD 106 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, CD-ROM/DVD-ROM drive 226, and/or floppy disk drive. The mass memory stores operating system 220 for controlling the operation of network device 200. Network device 200 also includes encrypted session manager 252, and other application 258.

As illustrated in FIG. 2, network device 200 also can communicate with the Internet, or some other communications network via network interface unit 210, which is constructed for use with various communication protocols including the TCP/IP protocol. Network interface unit 210 is sometimes known as a transceiver, transceiving device, or network interface card (NIC).

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 258 are loaded into mass memory and run on operating system 220. Examples of application programs may include email programs, routing programs, schedulers, calendars, database programs, word processing programs, HTTP programs, traffic management programs, security programs, and so forth.

Network device 200 may further include applications that support virtually any secure connection, including TLS, TTLS, EAP, SSL, IPSec, and the like. Such applications may include, for example, an encrypted session manager 252.

In one embodiment, encrypted session manager 252 may perform encrypted session processing, including managing an encrypted session handshake, managing keys, certificates, authentication, authorization, or the like. Moreover, encrypted session manager 252 may in one embodiment establish encrypted sessions and/or connections, terminate encrypted sessions and/or connections, establish itself as a man-in-the-middle of an encrypted session and/or connection, or the like. Moreover, encrypted session manager 252 may in one securely transfer session credentials from or to another TMD.

Additionally, network device 200 may include applications that support a variety of tunneling mechanisms, such as VPN, PPP, L2TP, and so forth.

Network device 200 may also include input/output interface 224 for communicating with external devices, such as a mouse, keyboard, scanner, or other input devices not shown in FIG. 2. Likewise, network device 200 may further include additional mass storage facilities such as CD-ROM/DVD-ROM drive 226 and hard disk drive 228. Hard disk drive 228 may be utilized to store, among other things, application programs, databases, certificates, public and private keys, secret data, and the like.

In one embodiment, the network device 200 includes at least one Application Specific Integrated Circuit (ASIC) chip (not shown) coupled to bus 222. The ASIC chip can include logic that performs some of the actions of network device 200. For example, in one embodiment, the ASIC chip can perform a number of packet processing functions for incoming and/or outgoing packets. In one embodiment, the ASIC chip can perform at least a portion of the logic to enable the operation of encrypted session manager 252.

In one embodiment, network device 200 can further include one or more field-programmable gate arrays (FPGA) (not shown), instead of, or in addition to, the ASIC chip. A number of functions of the network device can be performed by the ASIC chip, the FPGA, by CPU 212 with instructions stored in memory, or by any combination of the ASIC chip, FPGA, and CPU.

Illustrative Server Device Environment

Figure 3:
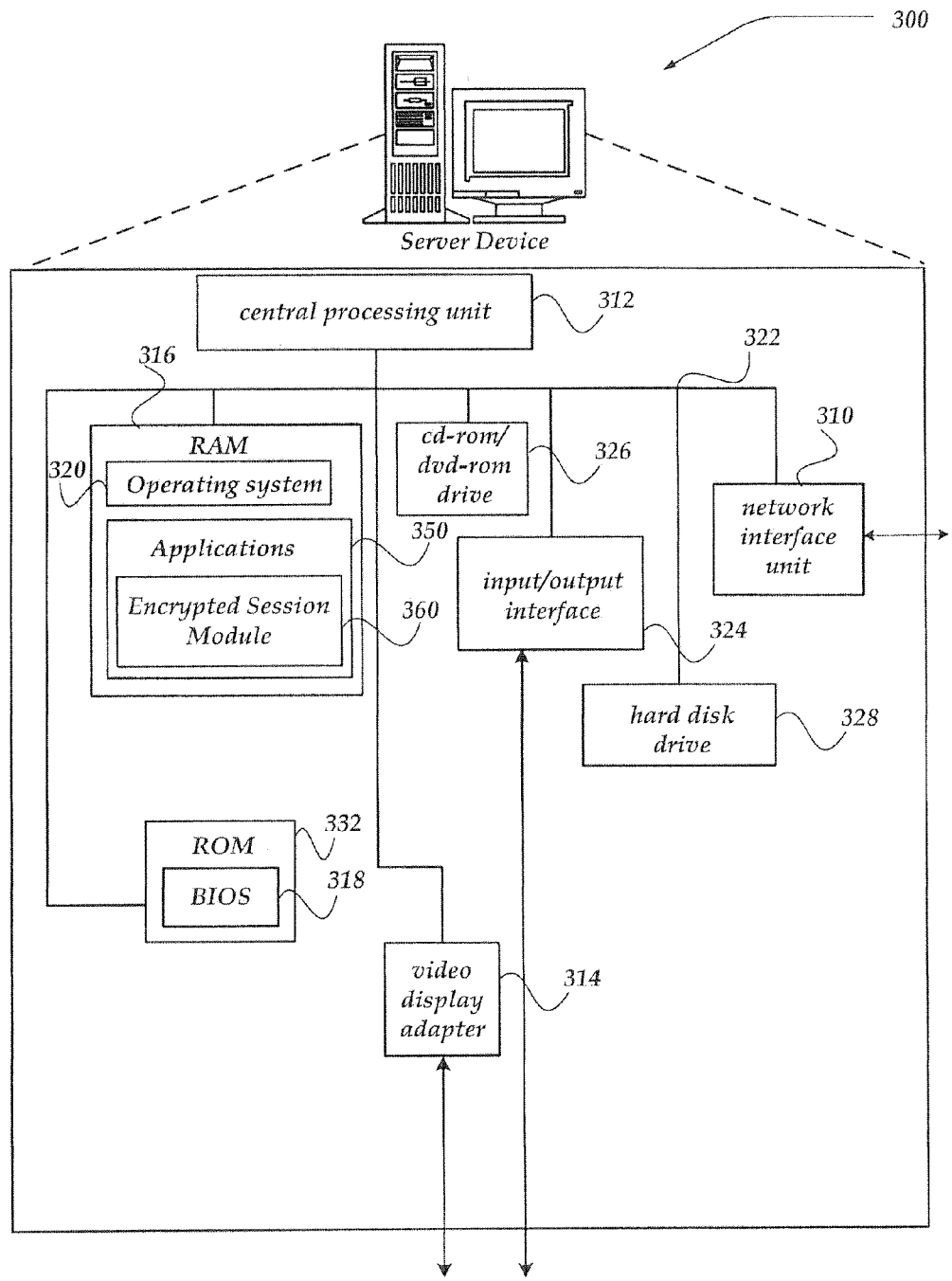
FIG. 3 illustrates one embodiment of a server device that may be included in a system implementing various embodiments.

FIG. 3 shows one embodiment of a server device, according to one embodiment of the invention. Server device 300 may include many more components than those shown. The components shown, however, are sufficient to disclose an illustrative embodiment for practicing the invention. Server device 300 may represent, for example, Servers 112-114 and Authentication Server 115 of FIG. 1.

Server device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, CD-ROM/DVD-ROM drive 326, and/or floppy disk drive. The mass memory stores operating system 320 for controlling the operation of server device 300. Any general-purpose operating system may be employed. Basic input/output system ("BIOS") 318 is also provided for controlling the low-level operation of server device 300. As illustrated in FIG. 3, server device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer-readable storage media may include volatile, nonvolatile, removable, and non-removable media implemented in any method or technology for storage of information, such as computer readable instructions, data structures, program modules, or other data. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by a computing device.

One or more applications 350 may be loaded into mass memory and run on operating system 320. Examples of application programs may include transcoders, schedulers, calendars, database programs, word processing programs, HTTP programs, customizable user interface programs, IPSec applications, encryption programs, security programs, VPN programs, web servers, account management, and so forth. Applications 350 may include encrypted session module 360. Encrypted session module 360 may establish encrypted sessions and/or connections with other network devices, including any of the network devices discussed above. In one embodiment, encrypted session module 360 may work cooperatively with TMD 110 or TMD 106 of FIG. 1. Additionally or alternatively, encrypted session module 360 may communicate with other network devices independent of any TMD. In one embodiment, encrypted session module 360 may send a request to create a new encrypted connection that is associated with an established encrypted session.

Applications 350 may also include a variety of web services that are configured to provide content, including messages, over a network to another computing device. These web services include for example, a web server, messaging server, a File Transfer Protocol (FTP) server, a database server, a content server, or the like. These web services may provide the content including messages over the network using any of a variety of formats, including, but not limited to WAP, HDML, WML, SMGL, HTML, XML, cHTML, xHTML, or the like.

Generalized Operation

Figure 4:
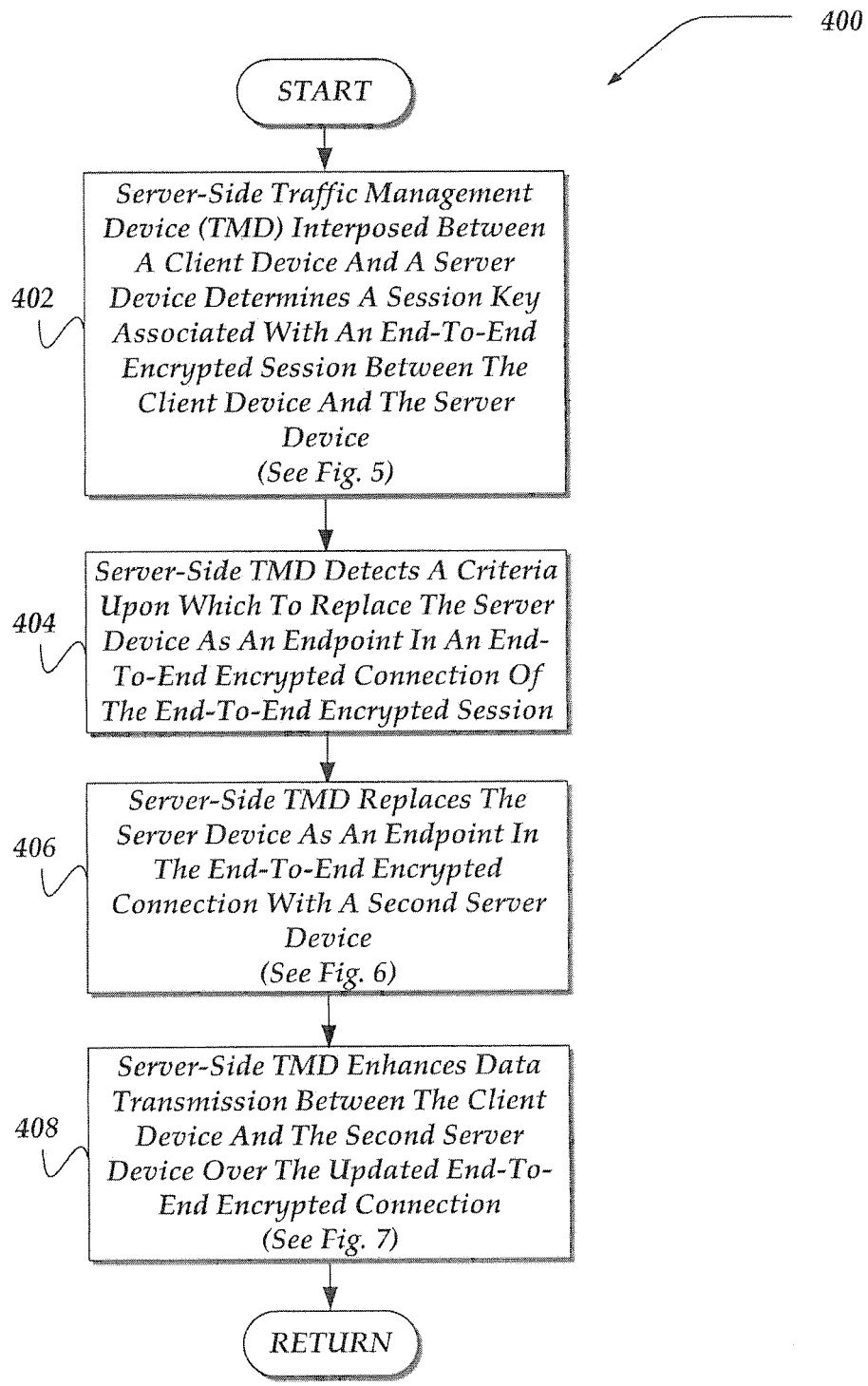
FIG. 4 illustrates a logical flow diagram generally showing one embodiment of an overview of a process for replacing an endpoint in an end-to-end encrypted connection.

The operation of certain aspects will now be described with respect to FIGS. 4-8. FIGS. 4-7 provide logical flow diagrams illustrating certain aspects, while FIG. 8 provides a signal flow diagram. FIG. 4 illustrates a logical flow diagram generally showing one embodiment of a process for replacing an endpoint in an end-to-end encrypted connection. In one embodiment, process 400 may be implemented by server-side TMD 110.

Process 400 begins, after a start block, at block 402, by a server-side TMD interposed between a client device and a first server device. In one embodiment, the server-side TMD determines a session key associated with an end-to-end encrypted session between the client device and the first server device. The determination of the session key is described in more detail below in conjunction with FIG. 5.

At block 404, the server-side TMD detects a criterion upon which to replace the first server device as an endpoint in an end-to-end connection associated with the end-to-end encrypted session. In one embodiment this detection criteria may include detecting a type of data requested by the client device. Additionally or alternatively the criteria may include aperiodic schedule, a system upgrade of the server device, a request by an administrator, or the like.

At block 406, the server-side TMD replaces the first server device with a second server device as an endpoint in the encrypted connection. In one embodiment, the server-side TMD utilizes a renegotiation of the encrypted connection to establish the second server device as an endpoint. The replacement of the server device with the second server device is described in more detail below in conjunction with FIG. 6.

At block 408, the server-side TMD may read, intercept, delay, augment, delete, prune, compress, enhance, accelerate, transpose, or otherwise modify data sent over the encrypted connection. In one embodiment, the server-side TMD may work in conjunction with a client-side TMD to further enhance data transmitted over the encrypted connection. The enhancement of data transmitted over the encrypted connection is described in more detail below in conjunction with FIG. 7. The process then terminates at a return block.

Figure 5:
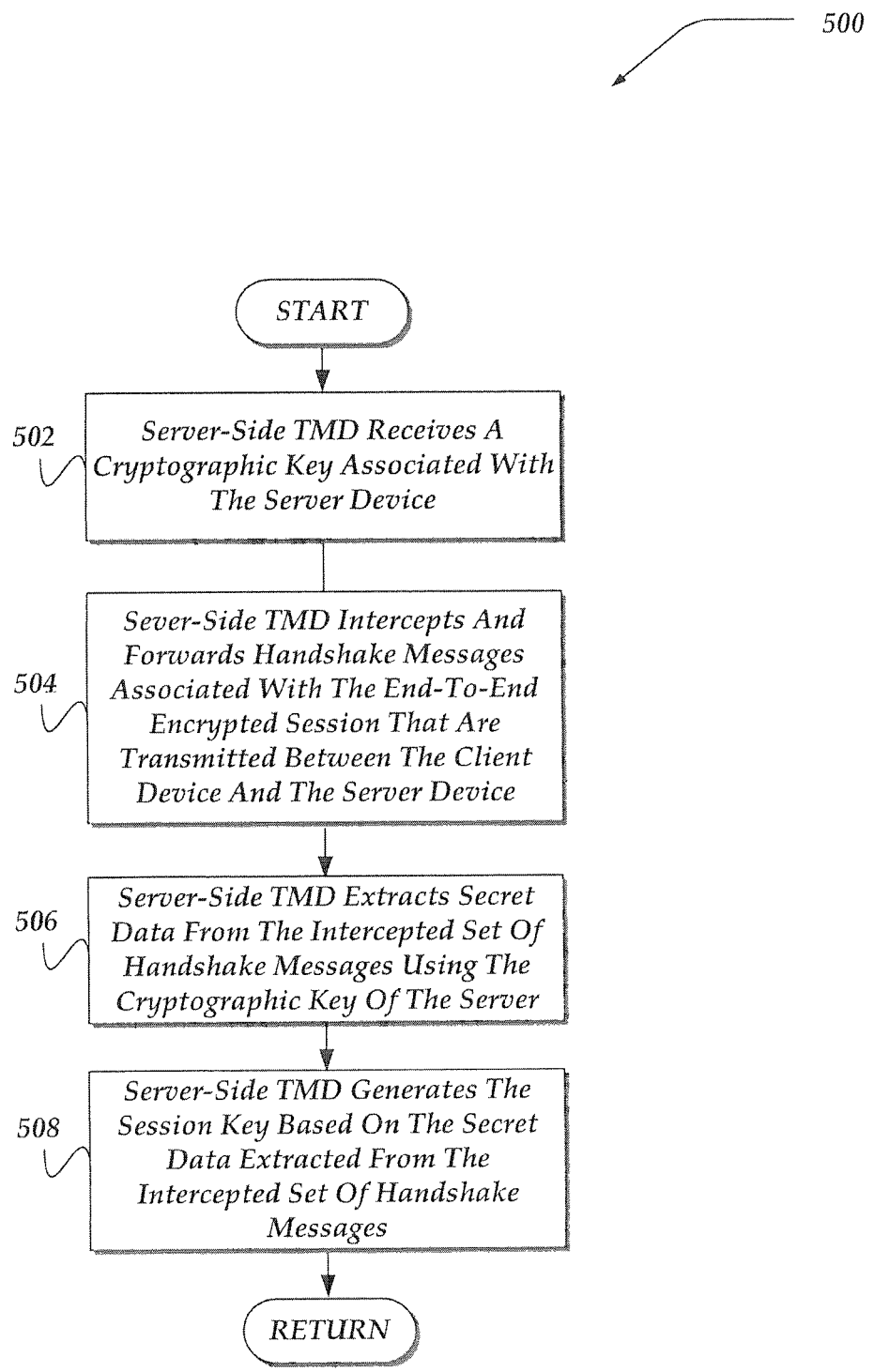
FIG. 5 illustrates a logical flow diagram generally showing one embodiment of a process for generating a session key associated with an end-to-end encrypted session.

FIG. 5 illustrates a logical flow diagram generally showing one embodiment of a process for generating a session key associated with an end-to-end encrypted session. In one embodiment, process 500 may be implemented by server-side TMD 110.

Process 500 begins, after a start block, at block 502, by receiving a private key associated with the first server device. In one embodiment, the first server device may comprise one of server devices 112-115 illustrated in FIG. 1. In one embodiment, the private key of the first server device may be provided by a system administrator. Additionally or alternatively, the private key may be provided by a local domain controller, LDAP server, or the second network device itself.

At block 504, a first set of handshake messages associated with an encrypted session are intercepted. In one embodiment, the creation of the encrypted session may be initiated by a client device, such as one of client devices 102-104. In one embodiment, the first set of handshake messages includes a "CLIENT HELLO" message sent by the client device toward a first server device. After being intercepted and stored, the "CLIENT HELLO" message may be forwarded on to the first server. In one embodiment, by storing the intercepted handshake messages such as the "CLIENT HELLO" message, the server-side TMD is enabled to perform the actions described herein at any time throughout the lifetime of the corresponding encrypted session.

In response to the "CLIENT HELLO", the first server device may send a "SERVER HELLO" message, a "SERVER CERTIFICATE" message enabling the client device to identify the first server device, a "SERVER KEY EXCHANGE" message including the first server device's public key, a "CERTIFICATE REQUEST" message requesting that the client send its certificate enabling the server device to identify the client device, and a "SERVER HELLO DONE" message, all of which may be intercepted and stored in a first set of handshake messages, and forwarded on to the client device.

In response to the "SERVER HELLO DONE" message, the client device may in one embodiment transmit a "CLIENT KEY EXCHANGE" message, including a random number (e.g. a nonce) generated by the client device and encrypted with the first server device's public key. In one embodiment, the "CLIENT KEY EXCHANGE" message may be intercepted, stored in the first set of handshake messages, and forwarded on to the first server device. Additionally, or alternatively, the first set of handshake messages may include any additional messages exchanged between the client device and the first server device while establishing the encrypted session, for example a "CER- TIFICATE" message containing the client device's certificate enabling the server device to identify the client device. In one embodiment, upon completion of this exchange of handshake messages, the client device and the first server device have established an end-to-end encrypted session.

Processing next continues to block 506, where secret data is extracted from the intercepted first set of handshake messages. In one embodiment, the received private key of the first server device may be used to extract secret data by decrypt the payload of the "CLIENT KEY EXCHANGE", including a random number generated by the client device and encrypted with the public key of the first server device. Additionally or alternatively, the server-side TMD extracts the "pre-master secret."

Processing next continues to block 508 where, in one embodiment, the decrypted random number is used in combination with one or more other random numbers exchanged between the client device and the first server device to generate a session key. In one embodiment, the session key may be a "master secret". In one embodiment, the session key is combined with one or more other random numbers exchanged during the encrypted session handshake to generate connection keys. The connection keys may be used to encrypt and decrypt data transmitted over the encrypted connection.

In one embodiment, the client device and the first server device also independently calculate the session key based on the exchanged handshake messages. In one embodiment, the client device and the first server device also independently calculate the connection keys. In some embodiments, the server-side TMD may calculate the session key based on information in the intercepted handshake messages. Alternatively, instead of independently calculating the session key, the server-side TMD may receive the session key and/or connection key(s) from one of the first server, the client, another network device, or a system administrator.

Regardless of how the connection keys are generated or obtained, the connection keys enable encrypted data transmitted between the client device and the first server device to be decrypted. In one embodiment, the server-side TMD may decrypt the data using the connection keys, and then may augment, delete, enhance, or otherwise modify the decrypted data. In one embodiment, the server-side TMD may re-encrypt the modified data using the connection keys, and transmit the modified data to the other of the client device and the first server device. The process then terminates at a return block.

Figure 6:
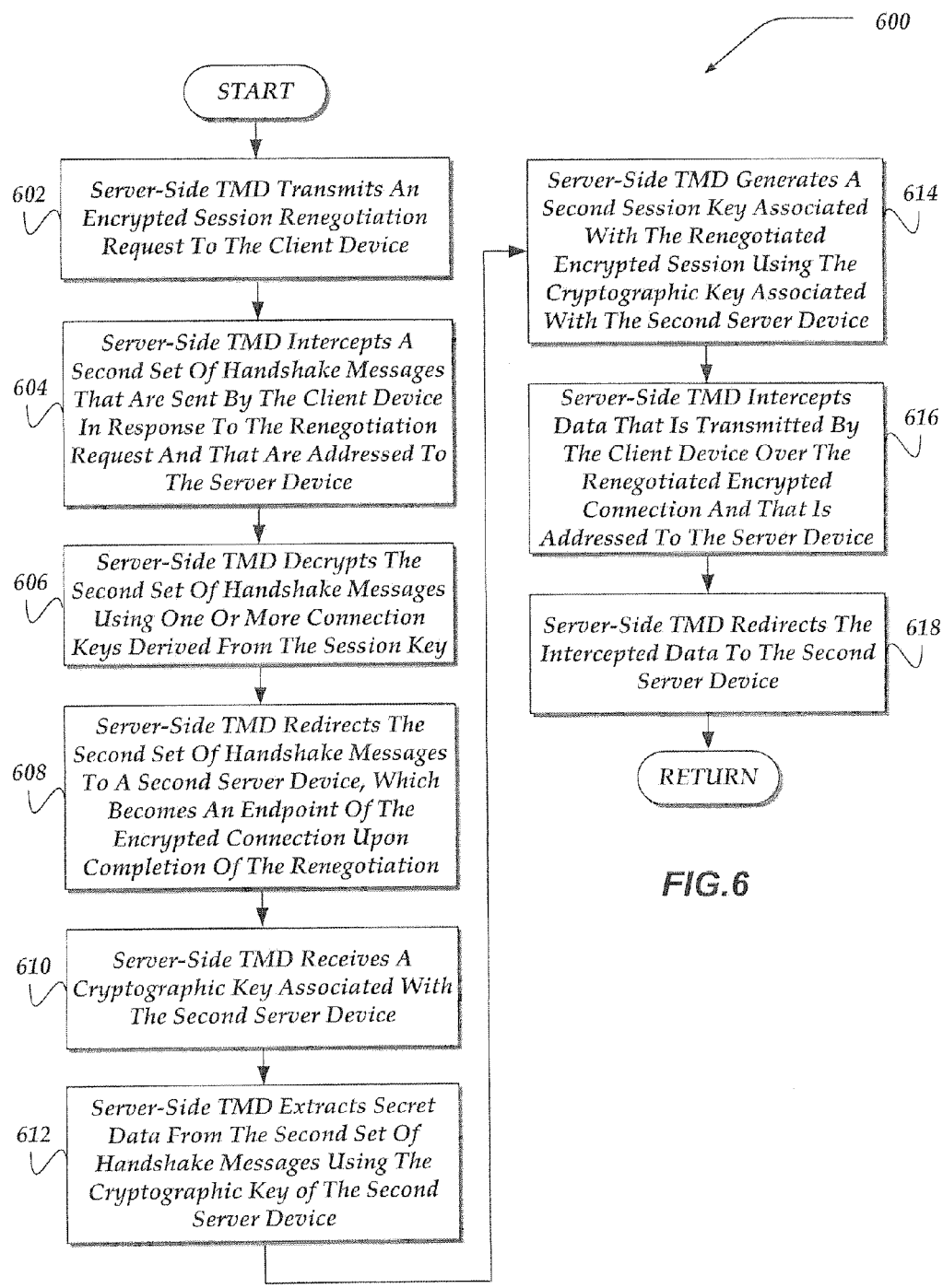
FIG. 6 illustrates a logical flow diagram generally showing one embodiment of a process for replacing an endpoint in an end-to-end encrypted connection with a second server device.

FIG. 6 illustrates a logical flow diagram generally showing one embodiment of a process for replacing an endpoint in an end-to-end encrypted connection with a second server device. In one embodiment, process 600 may be implemented by server-side TMD 110.

Process 600 begins, after a start block, at block 602, where in one embodiment server-side TMD transmits a renegotiation request to the client device over the end-to-end encrypted connection. In one embodiment, the server-side TMD transmits the renegotiation request message in response to extracting an HTTP header sent by either the client device or the first server device, and determining the HTTP header includes a request for content located on the second server device. Server-side TMD 110 may direct a request for a resource to a particular server device based on network traffic, network topology, capacity of a server device, content requested, and a host of other traffic distribution mechanisms. Also, sever-side TMD 110 may recognize packets that are part of the same communication, flow, and/or stream and may perform special processing on such packets, such as directing them to the same server device.

In one embodiment, the server-side TMD requests or otherwise initiates renegotiation by originating and transmitting an "SSL HELLO REQUEST" to the client device over the end-to-end encrypted connection. In one embodiment, the server-side TMD utilizes encrypted connection renegotiation to replace the first server device with one or more second server devices as an endpoint of the end-to-end encrypted connection. As discussed above, the client (or server) device may in one embodiment not know that a different server (or client) device has become the endpoint. In this way, the function of the server-side TMD may be transparent to the client (or server) device.

Processing next continues to block 604, where the server-side TMD intercepts a second set of handshake messages sent in response to the "SSL HELLO REQUEST". In one embodiment, the second set of handshake messages are encrypted using connection key and transmitted by the client device over the end-to-end encrypted connection. In one embodiment the second set of handshake messages are addressed to the first server device.

Processing next continues to block 606, where the server-side TMD decrypts the second set of handshake message using the connection key.

Processing next continues to block 608, where the server-side TMD redirects the decrypted second set of handshake messages to the second server device, thereby enabling the second server device to become an endpoint in the end-to-end encrypted connection. In one embodiment, by directing the second set of handshake messages to the second server device, the requests made by the client device over the end-to-end encrypted connection may be re-distributed by the server-side TMD to more than one server device. In one embodiment, the existing connection that had been established between the server-side TMD and the first server device is gracefully terminated by the server-side TMD. Alternatively, the existing connection between the server-side TMD and the first server device may be cached, pooled, or otherwise maintained for future use.

Additionally or alternatively, instead of establishing the second server device as an endpoint, the server-side TMD may utilize encrypted connection renegotiation to make itself an endpoint of the encrypted connection. In this embodiment, the server-side TMD may act as an encrypted connection accelerator: receiving encrypted content from the client device, decrypting the received content, forwarding the decrypted content to a server device for processing, and encrypting the server device's response. In such instances, the TMD may communicate with the first server device in the clear or establish another connection with the first server device. In another embodiment, the server-side TMD may generate encrypted content itself, rather than forwarding content from another server, such as a cached data or generated data. In another embodiment, a client-side TMD may similarly utilize encrypted connection renegotiation to make itself an endpoint of the encrypted connection, act as an encrypted connection accelerator, generate content such as cached data, and the like. Additionally or alternatively, the server-side TMD may ignore the ensuing renegotiation between the client device and the first server device, such that the server-side TMD ceases to decrypt and modify content sent over the end-to-end encrypted connection. Instead, the server-side TMD may route data sent over the renegotiated encrypted connection to the first server device as it would any other network connection. In some embodiments, a client-side TMD may also utilize encrypted connection renegotiation to ignore an ensuing renegotiation, "stepping out" of the encrypted connection.

Additionally or alternatively, the server-side TMD may terminate an encrypted connection to a client device and another encrypted connection to a server device. The server-side TMD may convert this pair of encrypted connections into a single end-to-end encrypted connection between the client device and the server device. In one embodiment, the server-side TMD may perform such a conversion by utilizing encrypted connection renegotiation and handshake message forwarding between the client device and the server device. In such an embodiment, the TMD may then perform any of the operations described herein on data transmitted over the end-to-end encrypted connection.

Processing next continues to block 610, where the private key of the second server device is received by the server-side TMD. Additionally or alternatively, the server-side TMD may receive the private key of the second server device before transmitting the renegotiation request. In one embodiment, the server-side TMD receives the private key of the second server device in any of the manners discussed above with regard to receiving the private key of the first server device.

Processing next continues to block 612, where the private key of the second server device is used to extract secret data from the second set of handshake messages. In one embodiment, the server-side TMD extracts secret data from the second set of handshake messages in a manner similar to the extraction of secret data from the first set of handshake messages, as discussed above with respect to block 506.

Processing next continues to block 614, where the server-side TMD generates a second session key based at least on the secret data extracted from the second set of handshake messages. In one embodiment, the second session key is generated in a manner similar to the generation of the first session key, as discussed above with respect to block 508. In one embodiment, the generated second session key is utilized to create a second set of connection keys, defining an end-to-end encrypted connection between the client device and the second server device.

Processing next continues to block 616, where a message sent over the end-to-end encrypted connection of the re-negotiated end-to-end encrypted session is intercepted and processed by the server-side TMD. In one embodiment, the intercepted message is transmitted by the client device and is addressed to the first server device, as the client device may be unaware that the second network device is now the other endpoint of the renegotiated end-to-end encrypted session. Additionally or alternatively, the second server device may transmit a message that is intercepted and processed by server-side TMD. In either case, server-side TMD may perform additional processing, optionally in conjunction with a client-side TMD and/or third party content provider 118, to augment, delete, prune, enhance, delay, accelerate, or otherwise modify the intercepted message. For example, an advertisement or other content may be provided by third party content provider 118, which may then be embedded in data transmitted between the second server device and the client device.

Processing next continues to block 618, where in the embodiment in which the sever-side TMD intercepts a message transmitted by the client device and addressed to the first server device, the server-side TMD redirects the intercepted message to the second server device. The process then terminates at a return block In one embodiment, the process illustrated in FIG. 6 enables an existing end-to-end encrypted connection to be handed off to a new server device, while from the perspective of the client device, the identity of the server is unchanged. In one embodiment, renegotiation happens within the existing encrypted session tunnel.

Figure 7:
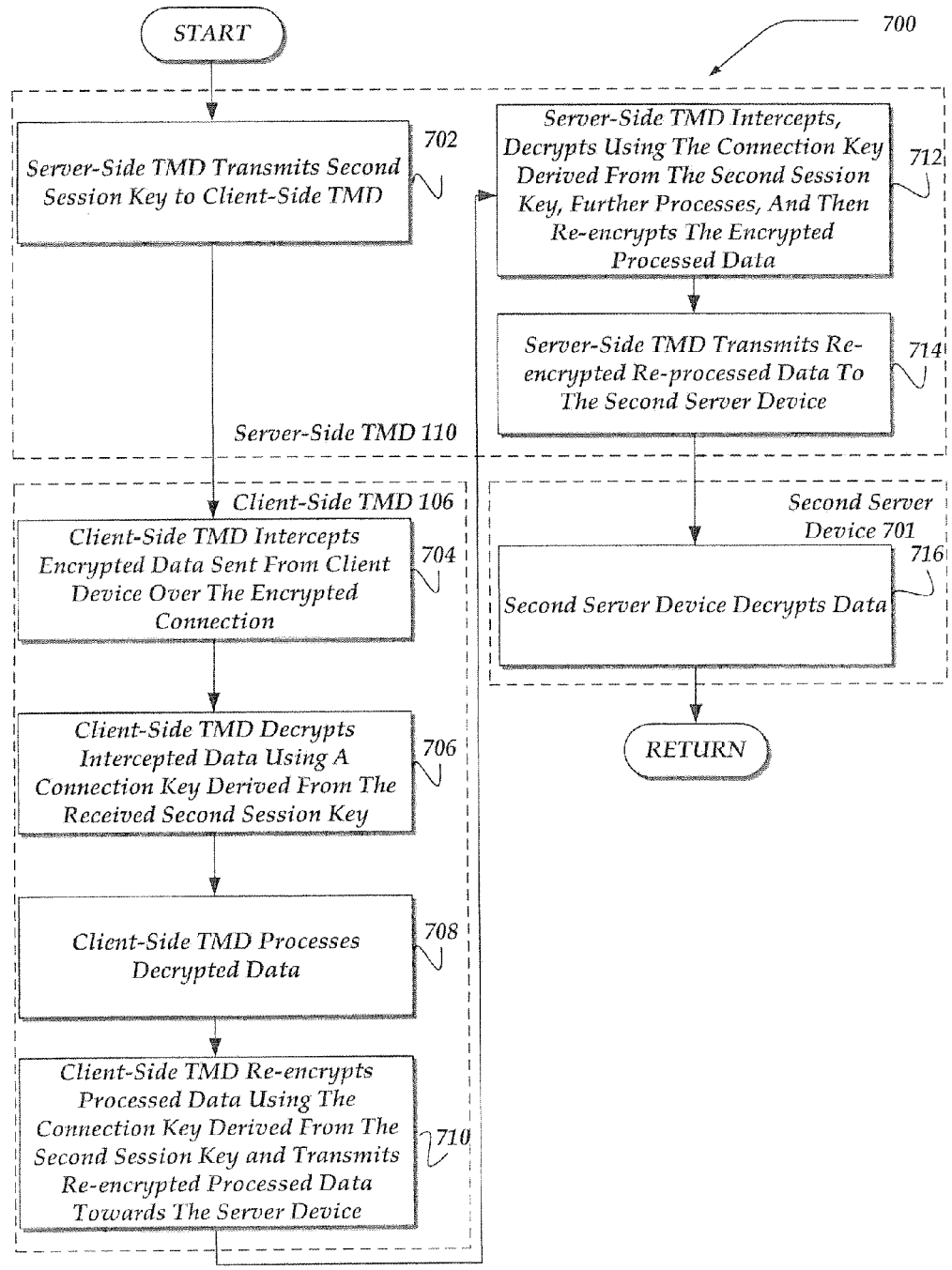
FIG. 7 illustrates a logical flow diagram generally showing one embodiment of a process for enhancing data transmitted between a client-side traffic management device (TMD) and a server-side TMD over the encrypted connection.
Figure 8:
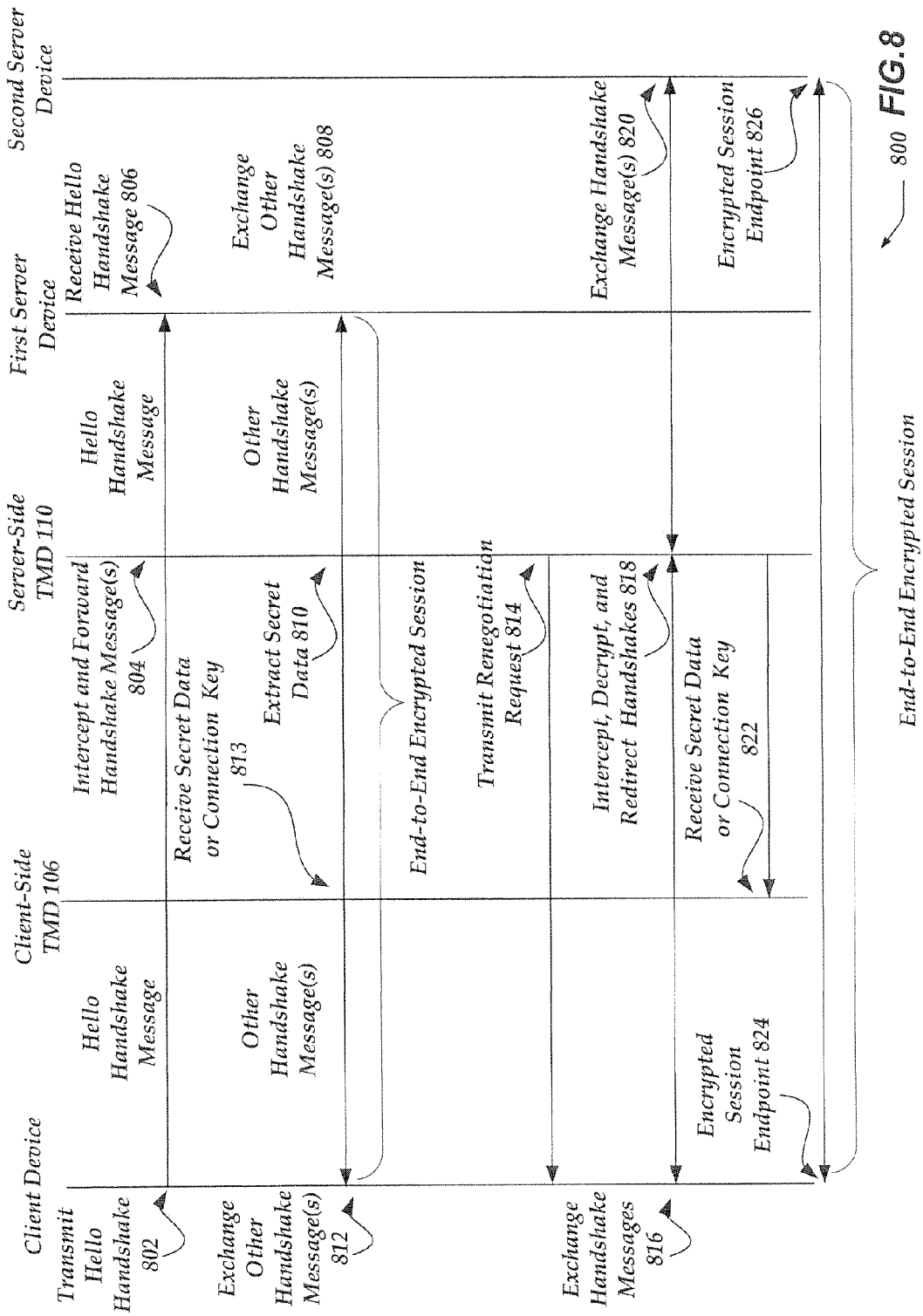
FIG. 8 illustrates one embodiment of a signal flow diagram generally usable with the process of FIG. 4.

FIG. 7 illustrates a logical flow diagram generally showing one embodiment of a process for enhancing data transmitted between a client-side TMD and a server-side TMD over the encrypted connection. In one embodiment, process 700 may be implemented by server-side TMD 110.

Process 700 begins, after a start block, at block 702, where the server-side TMD 110 transmits the second set of connection keys to a client-side TMD 106. In one embodiment, the second set of connection keys may be transmitted over the end-to-end encrypted session. Alternatively, the second set of connection keys may be transmitted over a separate encrypted session/connection, such as secure tunnel (B).

Processing next continues to block 704, where the client-side TMD 106, in one embodiment, intercepts encrypted data sent from the client device over the end-to-end encrypted connection. In one embodiment, typically when the client device is unaware that the second server device is now the endpoint of the end-to-end encrypted connection, the encrypted data sent by the client device may be addressed to the first server device. Additionally or alternatively, when the client device is aware that the second server device 701 is now the endpoint of the end-to-end encrypted connection, the encrypted data sent by the client device may be addressed to the second server device 701.

Processing next continues to block 706, where the client-side TMD 106, in one embodiment, decrypts the intercepted data using the received second set of connection keys.

Processing next continues to block 708, where the client-side TMD 106, in one embodiment, processes the decrypted data. In one embodiment, the decrypted data may be augmented, deleted, compressed, accelerated, or otherwise modified.

Processing next continues to block 710, where the client-side TMD 106, in one embodiment, re-encrypts the processed data using the second set of connection keys, and transmits the re-encrypted processed data towards the second server device 701. In this embodiment, processing continues at block 712.

Additionally or alternatively, the client-side TMD 106 may explicitly be working in conjunction with server-side TMD 110 to transmit data between the client device and the second server device 701. In this case, the client-side TMD 106 may transmit the processed data to the server-side TMD 110 using a separate tunnel, such as secure tunnel (B) through network 108. In this embodiment, the secure tunnel (B) may utilize an encrypted connection separate and apart from the end-to-end encrypted connection. In other words, client-side TMD 106 may communicate with server-side TMD 110 using a separate set of connection keys to encrypt the processed data, or another type of encryption entirely. Upon receiving the data transmitted through secure tunnel (B), the server-side TMD 110 typically decrypts and performs further processing on the decrypted data. For example, if the client-side TMD 106 compressed the processed data to reduce transmission time, the server-side TMD 110 typically may decompress the data, and optionally perform additional processing as discussed in conjunction with block 712 and throughout this disclosure. Then, processing continues at block 714.

In one embodiment, the client-side TMD 106 and the server-side TMD 110 may utilize two levels of encryption—the encryption used for the end-to-end encrypted connection established between the client device and the second server device 701, and additionally the encryption used by secure tunnel (B). This embodiment provides two layers of security for data transmitted over public networks, such as the internet, enhancing security of the transmitted data.

Processing next continues to block 712, where the server-side TMD 110 intercepts the processed data sent by the client-side TMD 106. In one embodiment, the server-side TMD 110 decrypts the intercepted data using the second set of connection keys.

In one embodiment, server-side TMD 110 performs further processing on the intercepted and decrypted data. In one embodiment, server-side TMD 110 augments, deletes, decompresses, or otherwise modifies the intercepted and decrypted data.

Processing next continues to block 714, where the server-side TMD 110 encrypts the further processed data using the second set of connection keys, and transmits the re-encrypted data to the second server device 701. In one embodiment, regardless of whether data was intercepted, decrypted, modified, re-encrypted, forwarded, or the like, the end-to-end encrypted connection (e.g. a connection contained in secure session (A) as shown in FIG. 1) remains intact from the perspective of the client device and the second server device 701.

Processing next continues to block 716, where the second server device 701 receives, decrypts, and processes the data transmitted by the server-side TMD 110. The process then terminates at a return block FIG. 8 illustrates a signal flow diagram generally showing one embodiment of the process of FIGS. 4-6.

Process 800 begins at 802 by the client device transmitting a "CLIENT HELLO" handshake message as discussed above with respect to block 504. Processing continues to 804, where the server-side TMD 110 intercepts and forwards handshake messages as also discussed above with respect to block 504. Processing continues to 806, where the first server receives the "CLIENT HELLO" handshake message, among others, as discussed above with respect to block 504.

Processing continues to 808 and 812, where other handshake messages are exchanged between the client device and the first server device, as discussed above with respect to block 504.

Processing continues to 810, where secret data, such as a random number generated by the client device and encrypted by the client device with the public key of the first server device, is extracted from the other handshake messages by the server-side TMD 110 using the private key of the first server device, as discussed above with respect to block 508.

Processing optionally continues to 813, where secret data, such as the secret data generated in 810, is received by client-side TMD 106. In one embodiment, this secret data may be used to generate a connection key. Additionally or alternatively, a connection key may be received by client-side TMD 106. In one embodiment, either the secret data or the connection key may be transmitted to client-side TMD 106 by server-side TMD 110. Once client-side TMD 106 has received or generated the connection key, client-side TMD 106 is enabled to intercept and enhance encrypted data as it is transmitted over the connection.

Processing continues to 814, where a renegotiation request is transmitted by the server-side TMD 110 to the client device, as discussed above with respect to block 602.

Processing continues to 816 and 820, where in response to receiving the renegotiation request, the client device begins to exchange a second set of handshake messages, as discussed above with respect to block 612.

Processing continues to 818, where the server-side TMD 110 intercepts, decrypts, and redirects the second set of handshake messages towards the second server, as discussed above with respect to blocks 804 and 806.

Processing continues to 822, where the server-side TMD 110 transmits the second set of connection keys to the client-side TMD 106, as discussed above with regard to FIG. 7.

Processing continues to 824 and 826, where the end-to-end connection initially established between the client device and the first server device has been altered as a result of the requested renegotiation, resulting in the encrypted connection being re-established between the client device and the second server device.

Figure 9:
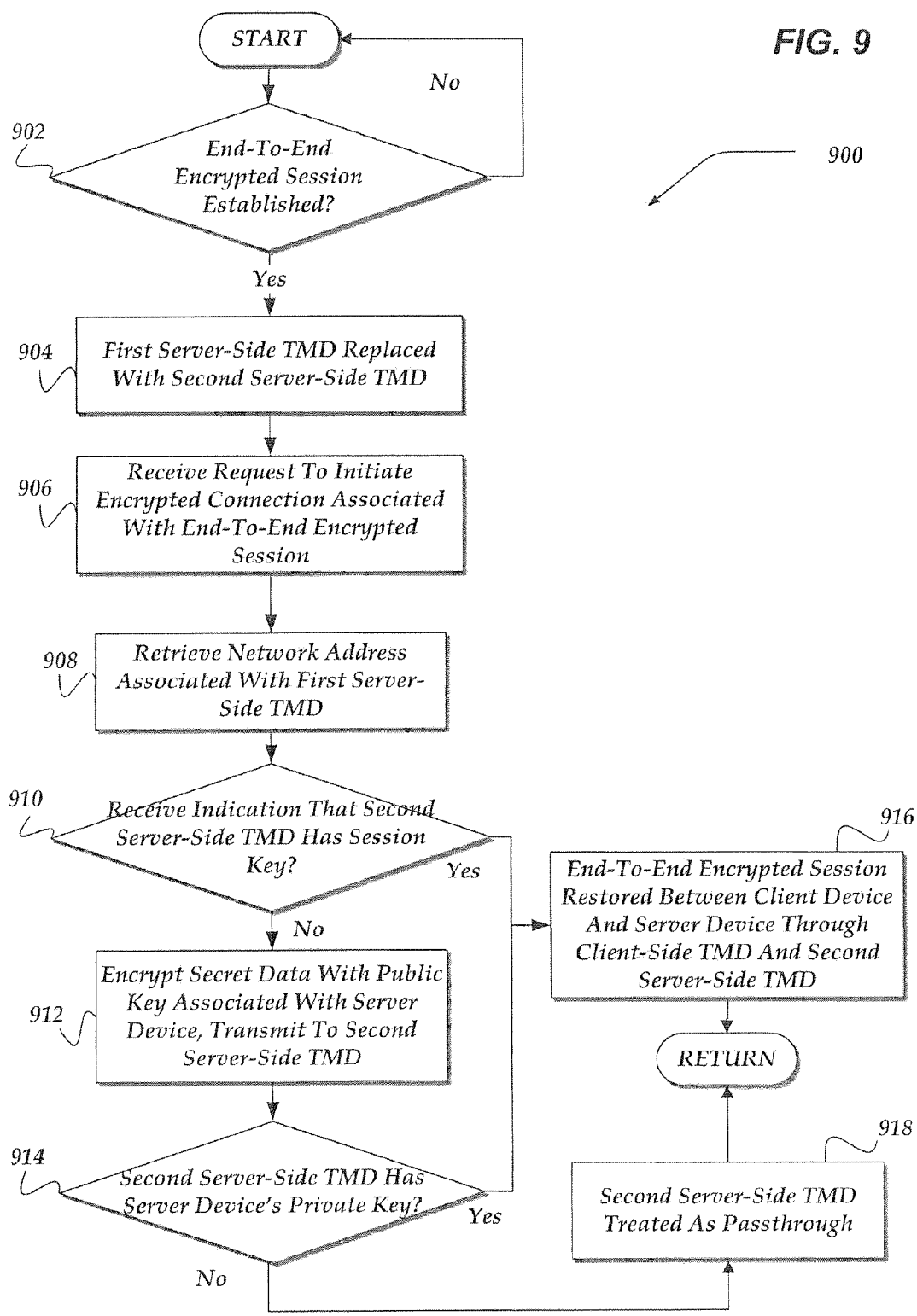
FIG. 9 illustrates a logical flow diagram showing one embodiment of a process for securely distributing session credentials from a client-side TMD to a server-side TMD.

Securely Transferring Session Credentials from a Client-Side Traffic Management Device to a Server-Side TMD FIG. 9 illustrates a logical flow diagram showing one embodiment of a process for securely distributing session credentials from a client-side TMD to a server-side TMD. In some embodiments, process 900 may be implemented as an application, program, software module or the like that executes within mass memory of the TMD, for example encrypted session manager 252 of FIG. 2.

Process 900 begins after a start block at decision block 902 where it is determined whether an end-to-end encrypted session has been established between a client device and a server device. In one embodiment, such an end-to-end encrypted session includes a client-side TMD and a first server-side TMD interposed between the client device and the server device, and which are enabled to intercept, decrypt, and modify encrypted data transmitted over encrypted connections associated with the encrypted session. In one embodiment, upon establishment of an end-to-end encrypted session, the first server-side TMD and the client-side TMD will have acquired secret data necessary to decrypt encrypted data transferred over encrypted connections associated with the encrypted session. Thus, in one embodiment, detecting if an end-to-end encrypted session has been established includes detecting if the client-side TMD has a copy of the secret data. How an end-to-end encrypted session is established is discussed in more detail above, particularly in conjunction with FIGS. 5 and 7. If an end-to-end encrypted session has been established, then the process 900 proceeds to block 904. However, if an end-to-end encrypted session has not been established, then the process 900 proceeds back the start block.

At block 904, in one embodiment, the first server-side TMD is replaced with a second server-side TMD. The first server-side TMD may be replaced with the second server-side TMD for any number of reasons, including planned scheduled maintenance, a software or hardware error resulting in a crash, a power failure, or the like. In one embodiment the second server-side TMD may be a designated backup TMD serving as a failover. Additionally or alternatively the second server-side TMD may be selected from a pool, or may be provided on demand. In one embodiment, the second server-side TMD may not have a copy of the secret data, particularly the session key, necessary to generate encrypted connection keys for decrypting data transmitted over encrypted connections associated with the encrypted session. In this way, the second server-side TMD may be unable to participate in the end-to-end encrypted session other than as a pass-through.

At block 906, in one embodiment, a request to initiate an encrypted connection associated with the end-to-end encrypted session is received from the client device at the client-side TMD. In another embodiment, a request to initiate an encrypted connection associated with the end-to-end encrypted session is received at the second server-side TMD from the server device. For the sake of simplifying the discussion, the embodiment in which the request to initiate the encrypted connection is received from the client device at the client-side TMD will be discussed, however the same techniques apply equally when the server device initiates the encrypted connection. In one embodiment, initiating an encrypted connection associated with the end-to-end encrypted session includes initiating an abridged handshake between the client device and the server device.

At block 908, in one embodiment, client-side TMD intercepts the abridged handshake. In one embodiment, upon intercepting the abridged handshake, the client-side TMD retrieves a network address associated with the first server-side TMD. In one embodiment the network address is an IP address, although a MAC address or any other type of network address is similarly contemplated. In one embodiment, the client-side TMD may retrieve the network address from memory. Additionally or alternatively, the client-side TMD may utilize a web service, a database, a configuration file, or the like to retrieve the network address. However, as the first server-side TMD has been replaced with the second server-side TMD, the network address associated with the first server-side TMD now points to the second server-side TMD. Thus, the client-side TMD is not aware of the true identity of the network device pointed to by the retrieved network address, or whether the network device has a copy of the session key.

At decision block 910, in one embodiment, the client-side TMD sends a message to the second server-side TMD to determine if the second server-side TMD has the session key associated with the end-to-end encrypted session. If the second server-side TMD responds affirmatively, then process 900 proceeds to block 916, where it is determined that the end-to-end encrypted session has been restored, before proceeding to a return block. However, if the second server-side TMD responds indicating it does not have the session key, then the process flows to block 912.

At block 912, in one embodiment, the client-side TMD transmits a hash of the server certificate to the second server-side TMD. Additionally or alternatively, the client-side TMD encrypts the cryptographic primitives used to establish the encrypted session using the server device's public key, and transmits them to the second server-side TMD. In one embodiment, the cryptographic primitives include the client and server random numbers (nonces), and the pre-master secret. In one embodiment, the cryptographic primitives enable the second server-side TMD to generate the session key, and thus any subsequent connection keys. Thus, if the second server-side TMD has a copy of the server device's private key, the second server-side TMD is enabled to decrypt the encrypted cryptographic credentials, generate the session key, and participate in the end-to-end encrypted session. By following this protocol, reliability of the encrypted session is enhanced, as the replacement of the first server-side TMD with the second server-side TMD can occur without requiring negotiation of a new encrypted session. Moreover, this distribution of session credentials from the client-side TMD to the server-side TMD is secure in that the private key used by the first server-side TMD generate the session key is the same private key that the second server-side TMD must have in order to access the encrypted cryptographic credentials received from the client-side TMD.

At decision block 914, in one embodiment, if the second server-side TMD has the private key of the server device, then the process 900 flows to block 916 where the second server-side TMD generates the session key necessary to restore the end-to-end encrypted session, upon which the process 900 flows to a return block. However, if the second server-side TMD does not have the necessary private key, then the process 900 proceeds to block 918 where the second server-side TMD may in one embodiment be used as a pass-through device, after which the process 900 flows to the return block.

Figure 10:
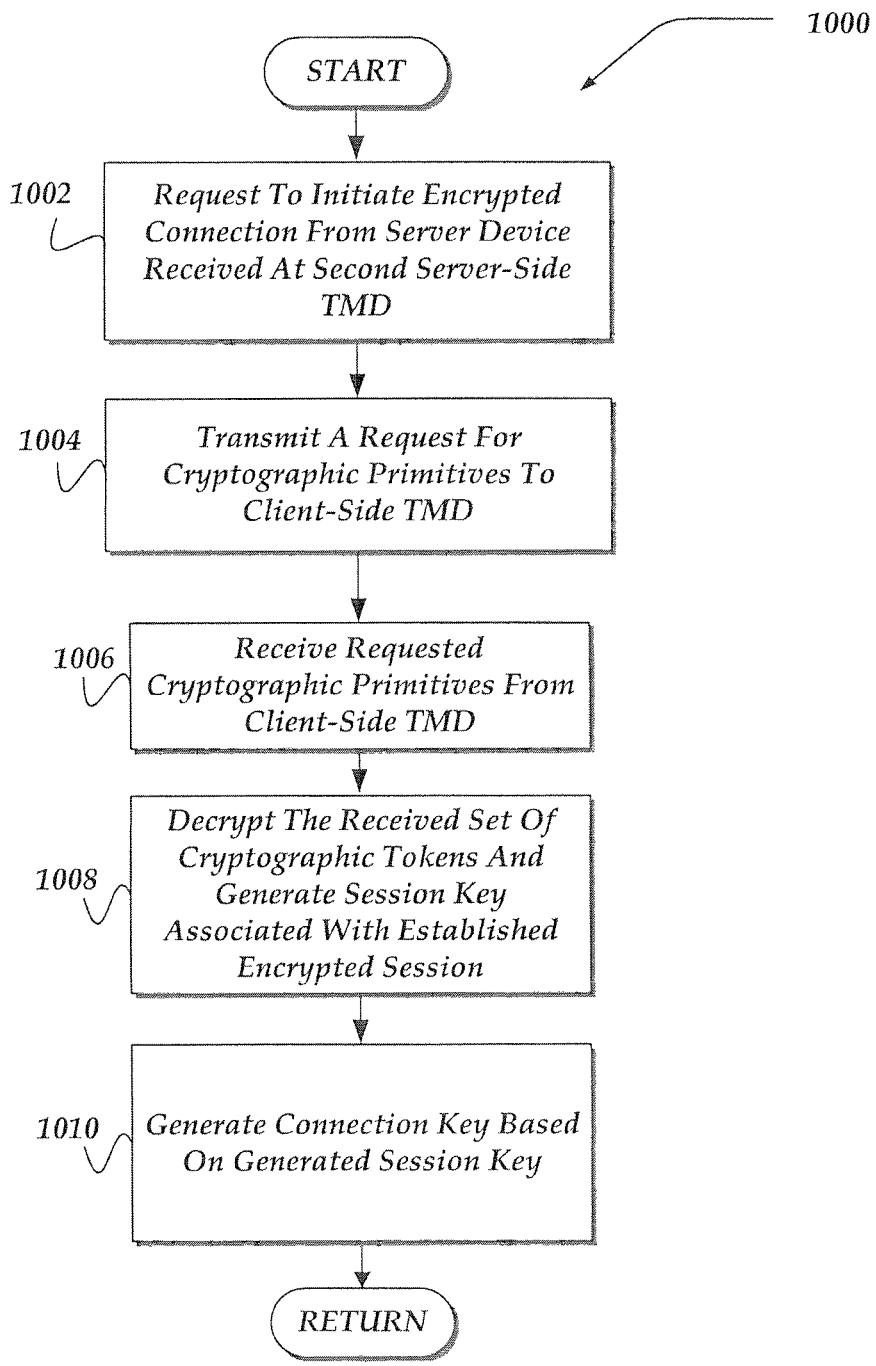
FIG. 10 illustrates a logical flow diagram showing one embodiment of a process for securely distributing session credentials from a client-side TMD to a server-side TMD.

FIG. 10 illustrates a logical flow diagram showing one embodiment of a process for securely distributing session credentials from a client-side TMD to a server-side TMD. In some embodiments, process 1000 may be implemented as an application, program, software module or the like that executes within mass memory of the TMD, for example encrypted session manager 252 of FIG. 2.

Process 1000 begins after a start block at block 1002 where in one embodiment a request to initiate an encrypted connection sent from a server device is intercepted by a second server-side TMD. In one embodiment the request to initiate the encrypted connection is associated with an encrypted session previously established between a client device and the server device, wherein a client-side TMD and a first server-side TMD were interposed between the client device and the server device, and wherein the client-side TMD and the first server-side TMD had access to a session key associated with the encrypted session. In one embodiment the first server-side TMD generated the session key as discussed above in conjunction with FIGS. 5 and 7. In one embodiment, the second server-side TMD does not have a copy of the session key associated with the established encrypted session.

At block 1004, in one embodiment, the second server-side TMD transmits a request to the client-side TMD for copies of cryptographic primitives associated with the established encrypted session. In one embodiment, the cryptographic primitives may include a client random number, a server random number, and a pre-master secret. In one embodiment, the cryptographic primitives enable the second server-side TMD to generate a copy of the session key associated with the established encrypted session.

At block 1006, in one embodiment, the second server-side TMD receives the requested set of cryptographic primitives from the client-side TMD. In one embodiment, the received set of cryptographic primitives are encrypted, however the received set of cryptographic primitives may alternatively be unencrypted. In one embodiment, the received set of cryptographic primitives are encrypted using the public key of the server device, although any other means of encryption known to the client-side TMD and the second server-side TMD may be used. Additionally or alternatively, the client-side TMD and the second server-side TMD may communicate over an encrypted session/connection distinct from form the established encrypted session, such as secure tunnel (B).

At block 1008, in one embodiment, the second server-side TMD decrypts the encrypted set of cryptographic primitives using the server device's private key. However, as other encryption methods are contemplated, the second server-side TMD may decrypt the encrypted cryptographic primitives using the corresponding decryption method. Once the second server-side TMD has access to the set of cryptographic primitives, the second server-side TMD may in one embodiment generate the session key associated with the established encrypted session. In one embodiment, the session key may be generated using the same techniques a network device party to the initiation of an encrypted session uses.

At block 1010, in one embodiment, the second server-side TMD generates a connection key based on the generated session key. In one embodiment the connection key is a symmetric key usable to decrypt and/or encrypt data transmitted over the encrypted connection, as discussed herein. However, the connection key also may include an asymmetric key pair such as a public/private key pair. In one embodiment, the generated connection key is associated with the encrypted connection requested by the server device. Process 1000 then flows to a return block.

It will be understood that figures, and combinations of steps in the flowchart-like illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. These program instructions may be stored on a computer readable medium or machine readable medium, such as a computer readable storage medium.

Accordingly, the illustrations support combinations of means for performing the specified actions, combinations of steps for performing the specified actions and program instruction means for performing the specified actions. It will also be understood that each block of the flowchart illustration, and combinations of blocks in the flowchart illustration, can be implemented by modules such as special purpose hardware-based systems which perform the specified actions or steps, or combinations of special purpose hardware and computer instructions.

The above specification, examples, and data provide a complete description of the manufacture and use of the composition of the described embodiments. Since many embodiments can be made without departing from the sprit and scope of this description, the embodiments reside in the claims hereinafter appended.

What is claimed as new and desired to be protected by Letters Patent of the United States is:

1. A traffic management device (TMD) for managing network traffic between a client device and a server device, comprising:
   a transceiver to send and receive data over a network; and
   a processor, in communication with the transceiver, that performs actions, including:
      intercepting a request to initiate an encrypted connection associated with an established encrypted session, wherein the established encrypted session was previously established between the client device and the server device, wherein the TMD and a first server-side TMD are interposed between the client device and the server device in the established encrypted session such that the client device and the first server-side TMD are in communication with the TMD, and wherein the first server-side TMD is in communication with the server device;
      obtaining a network address of the first server-side TMD, wherein the network address points to a second server-side TMD based upon replacement of the first server-side TMD with the second server-side TMD such that the TMD is unaware of a true identity of a network device pointed to by the network address;
      determining when the TMD includes a set of cryptographic primitives for the established encrypted session;
      encrypting the set of cryptographic primitives associated with the established encrypted session using a public key associated with the server device;
      transmitting the encrypted set of cryptographic primitives to the second server-side TMD, wherein the second server-side TMD generates a session key based on the cryptographic primitives to create the encrypted connection to replace the first server-side TMD in the established encrypted session without requiring negotiation of a new encrypted session between the client device and the server device, and the second server-side TMD is enabled to decrypt data associated with the established encrypted session without negotiation of a new encrypted session; and
      sending a message to the second server-side TMD asking if the second server-side TMD has a copy of the session key associated with the established encrypted session.

2. The traffic management device of claim 1, wherein the actions further include:
   receiving an indication from the second server-side TMD that the established encrypted session has been re-established through the second server-side TMD.

3. The traffic management device of claim 1, wherein the second server-side TMD replaced the first server-side TMD due to at least one of a system crash, a scheduled maintenance, or a network outage.

4. The traffic management device of claim 1, wherein the second server-side TMD is enabled to decrypt the encrypted cryptographic primitives using a private key associated with the server device and the public key and employ the cryptographic primitives to generate a session key and participate in the established encrypted session.

5. The traffic management device of claim 1, herein the request to initiate the encrypted connection is received from the client device.

6. A system for managing network traffic, comprising:
   a client device;
   a server device;
   a client-side traffic management device (TMD) in communication with the client device;
      determining if the client-side TMD includes a set of cryptographic primitives for an encrypted session that was previously established between the client device and the server device, wherein the client-side TMD and a server-side TMD are interposed between the client device and the server device in the established encrypted session; and
   the server-side TMD in communication with the server device and in communication with the client-side TMD and configured to perform actions including:
      intercepting a request to initiate an encrypted connection associated with the established encrypted session;

transmitting a request for cryptographic primitives to the client-side TMD;

employing a network address of another server-side TMD that points to the server-side TMD based upon replacement of the other server-side TMD with the server-side TMD to receive an encrypted set of cryptographic primitives associated with the established encrypted session, wherein the set of cryptographic primitives are encrypted with a public key associated with the server device, and wherein the client-side TMD is unaware of a true identity of a network device pointed to by the network address;

decrypting the encrypted set of cryptographic primitives;

generating a session key associated with the established encrypted session based on the decrypted set of cryptographic primitives such that the server-side TMD replaces the other server-side TMD in the established encrypted session without requiring negotiation of a new encrypted session between the client device and the server device, wherein the server-side TMD is enabled to decrypt data associated with the established encrypted session;

generating an encryption key associated with the requested encrypted connection based on the generated session key; and participating in the established encrypted session without negotiation of a new encrypted session; and employing the client side TMD to send a message to the server-side TMD asking if the server-side TMD has a copy of the session key associated with the established encrypted session.

7. The system of claim 6, wherein decrypting the encrypted set of cryptographic primitives includes using a private key associated with the server device.

8. The system of claim 6, wherein decrypting the encrypted set of cryptographic primitives includes using a private key associated with the server device, wherein the private key associated with the server device is the same private key used by another server-side TMD to originally generate a session key associated with the established session, and wherein the private key is employed to generate the session key and participate in the established session.

9. The system of claim 6, wherein prior to receiving the request to initiate the encrypted connection, the server-side TMD replaced another server-side TMD that had a copy of a session key associated with the established encrypted session.

10. The system of claim 6, wherein the set of cryptographic primitives includes a client random number, a server random number, or a pre-master secret used to initialize the established encrypted session.

11. The system of claim 6, wherein the request to initiate the encrypted connection is received from the server device.

12. A non-transitory processor readable storage medium storing instructions that enable a processor to perform actions for managing network traffic between a client device and a server device, comprising:

intercepting a request to initiate an encrypted connection associated with the established encrypted session, wherein the established encrypted session was previously established between the client device and the server device, wherein the processor and a first server-side traffic management device (TMD) are interposed between the client device and the server device in the established encrypted session such that the first server-side TMD is in communication with the server device and with the processor, and wherein the processor is in communication with the client device and the first server-side TMD;

obtaining a network address of the first server-side TMD, wherein the network address points to a second server-side TMD based upon replacement of the first server-side TMD with the second server-side TMD such that the TMD is unaware of a true identity of a network device pointed to by the network address;

determining when the processor has a set of cryptographic primitives for the established encrypted session;

encrypting the set of cryptographic primitives associated with the established encrypted session using a public key associated with the server device; and transmitting the encrypted set of cryptographic primitives to the second server-side TMD, wherein the second server-side TMD generates a session key based on the cryptographic primitives to create the encrypted connection to replace the first server-side TMD in the established encrypted session without requiring negotiation of a new encrypted session between the client device and the server device, and the second server-side TMD is enabled to decrypt data associated with the established encrypted session without negotiation of a new encrypted session; and sending a message to the server-side TMD asking if the server-side TMD has a copy of the session key associated with the established encrypted session.

13. The non-transitory processor readable storage medium of claim 12, wherein the second server-side TMD replaced the first server-side TMD due to at least one of a system crash, a scheduled maintenance, or a network outage.

14. The non-transitory processor readable storage medium of claim 12, wherein the set of cryptographic primitives includes a client random number, a server random number, or a pre-master secret used to initialize the established encrypted session.

15. The non-transitory processor readable storage medium of claim 12, wherein the actions further include:

sending a message to the second server-side TMD asking if the second server-side TMD has a copy of the session key associated with the established encrypted session.

16. The non-transitory processor readable storage medium of claim 12, wherein the actions further include treating the second server-side TMD as a pass-through when the second server-side TMD does not have a copy of the private key associated with the server device.

17. The non-transitory processor readable storage medium of claim 12, wherein the second server-side TMD is enabled to decrypt the encrypted cryptographic primitives using a private key associated with the server device and the public key and employ the cryptographic primitives to generate a session key and participate in the established encrypted session.

18. The non-transitory processor readable storage medium of claim 12, wherein the request to initiate the encrypted connection is received from the client device.

\* \* \* \* \*